(12) United States Patent
He

(10) Patent No.: US 11,690,094 B2
(45) Date of Patent: Jun. 27, 2023

(54) TECHNIQUES FOR TRAFFIC STEERING BETWEEN ACCESS LINKS AND SIDELINKS IN WIRELESS COMMUNICATIONS SYSTEMS

(71) Applicant: QUALCOMM Incorporated, San Diego, CA (US)

(72) Inventor: Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 59 days.

(21) Appl. No.: 17/168,143

(22) Filed: Feb. 4, 2021

(65) Prior Publication Data

US 2022/0248421 A1 Aug. 4, 2022

(51) Int. Cl.
*H04W 72/12* (2023.01)
*H04W 72/566* (2023.01)
*H04W 72/0453* (2023.01)
*H04W 72/02* (2009.01)
*H04W 72/1263* (2023.01)
*H04W 28/02* (2009.01)
*H04W 72/21* (2023.01)

(52) U.S. Cl.
CPC ..... *H04W 72/569* (2023.01); *H04W 28/0278* (2013.01); *H04W 72/02* (2013.01); *H04W 72/0453* (2013.01); *H04W 72/1263* (2013.01); *H04W 72/21* (2023.01)

(58) Field of Classification Search
None
See application file for complete search history.

(56) References Cited

U.S. PATENT DOCUMENTS

| | | | | |
|---|---|---|---|---|
| 2018/0146467 A1* | 5/2018 | Kim | ...... | H04W 72/20 |
| 2018/0167945 A1* | 6/2018 | Cao | ...... | H04W 72/04 |
| 2021/0144582 A1* | 5/2021 | Yi | ...... | H04W 72/23 |
| 2022/0279537 A1* | 9/2022 | Freda | ...... | H04W 72/569 |

* cited by examiner

*Primary Examiner* — Kouroush Mohebbi
(74) *Attorney, Agent, or Firm* — Holland & Hart / Qualcomm

(57) ABSTRACT

Methods, systems, and devices for wireless communication are described. Generally, the described techniques provide for a user equipment (UE) to receive a logical channel configuration indicating whether logical channels at the UE are configured to use an access link, a sidelink, or both. A UE may determine that data is available on one or more logical channels and may transmit a buffer status report and a scheduling request to a base station based on the determination. In response, the base station may transmit an uplink grant to the UE allocating resources for transmitting the available data based on the logical channel configuration. The UE may transmit the available data on the access link, the sidelink, or both, based on the received uplink grant, the logical channels to which the available data applies, and the logical channel configuration.

30 Claims, 15 Drawing Sheets

TECHNIQUES FOR TRAFFIC STEERING BETWEEN ACCESS LINKS AND SIDELINKS IN WIRELESS COMMUNICATIONS SYSTEMS

FIELD OF TECHNOLOGY

The following relates to wireless communication, including techniques for traffic steering between access links and sidelinks in wireless communications systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems support both access links and sidelinks between devices. For example, a UE may establish an access link with a base station as well as a sidelink with another UE. However, the sidelink and the access link may have different characteristics, and the UE may likewise transmit different types of data over each link. Thus, techniques for efficiently steering traffic over the access link and the sidelink may be desirable.

SUMMARY

The described techniques relate to improved methods, systems, devices, and apparatuses that support techniques for traffic steering between access links and sidelinks in wireless communications systems. Generally, the described techniques provide for a user equipment (UE) to receive a logical channel configuration indicating whether logical channels at the UE are configured to use an access link, a sidelink, or both. A UE may determine that data is available on one or more logical channels and may transmit a scheduling request to a base station based on the determination. In some examples, the available data may trigger a buffer status report that is sent to the base station prior to the scheduling request. In such cases, the buffer status report may be transmitted on the access link or the sidelink based on whether another UE associated with the sidelink is connected to the same or different base station as the UE and how a logical channel corresponding to the buffer status report (and the available data) is configured (e.g., configured to use the access link, the sidelink, or both). In some examples, the scheduling request may be transmitted on resources that are mapped to a corresponding logical channel based on one or more scheduling request configurations. In response to the scheduling request, the base station may transmit an uplink grant to the UE allocating resources on the access link, the sidelink, or both for transmitting the available data based on the logical channel configuration. The UE may transmit the available data using the allocated resources on the access link, the sidelink, or both, based on the received uplink grant, the logical channels to which the available data applies, and the logical channel configuration. In some examples, the UE may transmit the data based on a logical channel prioritization restriction configuration and/or a scheduling priority associated with the link (e.g., the access link or the sidelink). Implementing the described techniques may lead to an increased efficiency or a reduced latency, among other benefits.

A method for wireless communication at a UE is described. The method may include receiving a logical channel configuration for a set of logical channels at the UE, the logical channel configuration indicating whether each logical channel of the set of logical channels is configured to use an access link, or a sidelink, or both, determining that a logical channel of the set of logical channels has available data, and transmitting a message including the available data based on the determination, where the message including the available data is transmitted on the access link or the sidelink based on the logical channel configuration for the logical channel.

An apparatus for wireless communication at a UE is described. The apparatus may include a processor, memory coupled with the processor, and instructions stored in the memory. The instructions may be executable by the processor to cause the apparatus to receive a logical channel configuration for a set of logical channels at the UE, the logical channel configuration indicating whether each logical channel of the set of logical channels is configured to use an access link, or a sidelink, or both, determine that a logical channel of the set of logical channels has available data, and transmit a message including the available data based on the determination, where the message including the available data is transmitted on the access link or the sidelink based on the logical channel configuration for the logical channel.

Another apparatus for wireless communication at a UE is described. The apparatus may include means for receiving a logical channel configuration for a set of logical channels at the UE, the logical channel configuration indicating whether each logical channel of the set of logical channels is configured to use an access link, or a sidelink, or both, means for determining that a logical channel of the set of logical channels has available data, and means for transmitting a message including the available data based on the determination, where the message including the available data is transmitted on the access link or the sidelink based on the logical channel configuration for the logical channel.

A non-transitory computer-readable medium storing code for wireless communication at a UE is described. The code may include instructions executable by a processor to receive a logical channel configuration for a set of logical channels at the UE, the logical channel configuration indicating whether each logical channel of the set of logical channels is configured to use an access link, or a sidelink, or both, determine that a logical channel of the set of logical channels has available data, and transmit a message including the available data based on the determination, where the message including the available data is transmitted on the access link or the sidelink based on the logical channel configuration for the logical channel.

Some examples of the method, apparatuses, and non-transitory computer-readable medium described herein may further include operations, features, means, or instructions for identifying a logical channel prioritization restriction configuration based on the logical channel configuration, the logical channel prioritization restriction configuration associating each logical channel of the set of logical channels with the access link, the sidelink, or both, where transmitting the message including the available data may be based on the logical channel prioritization restriction configuration.

Some examples of the method, apparatuses, and non-transitory computer-readable medium described herein may further include operations, features, means, or instructions for identifying an uplink control channel resource configuration based on the logical channel configuration, the uplink control channel resource configuration indicating a set of resources for transmitting one or more scheduling requests on the access link, the sidelink, or both, based on data for one or more logical channels of the set of logical channels.

Some examples of the method, apparatuses, and non-transitory computer-readable medium described herein may further include operations, features, means, or instructions for transmitting a scheduling request using the set of resources, where the set of resources may be selected based on the available data for the logical channel and one or more scheduling request configurations mapped to the logical channel.

Some examples of the method, apparatuses, and non-transitory computer-readable medium described herein may further include operations, features, means, or instructions for receiving a resource grant for transmitting the available data, the resource grant allocating resources on the access link, or the sidelink, or both, based on a logical channel prioritization restriction configuration and the logical channel, where the resource grant may be received based on the scheduling request.

Some examples of the method, apparatuses, and non-transitory computer-readable medium described herein may further include operations, features, means, or instructions for determining that each scheduling request configuration of the one or more scheduling request configurations indicates uplink control channel resources on the access link, uplink control channel resources on the sidelink, or both and selecting the set of resources from the uplink control channel resources on the access link or the uplink control channel resources on the sidelink based on the logical channel being associated with the access link, or the sidelink, or both.

Some examples of the method, apparatuses, and non-transitory computer-readable medium described herein may further include operations, features, means, or instructions for generating a buffer status report indicating that data may be available for one or more logical channels of the set of logical channels, where the data available for the one or more logical channels includes the available data for the logical channel and transmitting the buffer status report on the access link or the sidelink, where transmitting a scheduling request may be based on the buffer status report.

Some examples of the method, apparatuses, and non-transitory computer-readable medium described herein may further include operations, features, means, or instructions for determining that the available data for the one or more logical channels of the set of logical channels may be restricted to one of the access link or the sidelink based on a logical channel prioritization restriction configuration and the one or more logical channels, where transmitting the buffer status report may be based on determining that the available data for the one or more logical channels of the set of logical channels may be restricted to one of the access link or the sidelink.

In some examples of the method, apparatuses, and non-transitory computer-readable medium described herein, transmitting the buffer status report may include operations, features, means, or instructions for transmitting the buffer status report on the access link based on the logical channel being restricted to the access link based on the logical channel prioritization restriction configuration, the buffer status report including an indication of data available for logical channels associated with the access link.

In some examples of the method, apparatuses, and non-transitory computer-readable medium described herein, transmitting the buffer status report may include operations, features, means, or instructions for transmitting the buffer status report on the sidelink based on the logical channel being restricted to the sidelink based on the logical channel prioritization restriction configuration, the buffer status report including an indication of data available for logical channels associated with the sidelink.

In some examples of the method, apparatuses, and non-transitory computer-readable medium described herein, transmitting the buffer status report may include operations, features, means, or instructions for transmitting the buffer status report to a base station, where the access link and the sidelink may be both associated with the base station.

In some examples of the method, apparatuses, and non-transitory computer-readable medium described herein, transmitting the buffer status report may include operations, features, means, or instructions for transmitting the buffer status report to a first base station or a second base station different from the first base station, where the access link may be associated with the first base station and the sidelink may be associated with the second base station.

Some examples of the method, apparatuses, and non-transitory computer-readable medium described herein may further include operations, features, means, or instructions for identifying a scheduling priority configuration for the set of logical channels based on the logical channel configuration, the scheduling priority configuration indicating a priority associated with each logical channel of the set of logical channels for the access link, or the sidelink, or both.

In some examples of the method, apparatuses, and non-transitory computer-readable medium described herein, transmitting the message including the available data may include operations, features, means, or instructions for multiplexing data for one or more logical channels based on the scheduling priority configuration for the one or more logical channels, the multiplexed data including the available data, where the one or more logical channels may be associated with the access link, or the sidelink, or both, and where the message includes the multiplexed data.

In some examples of the method, apparatuses, and non-transitory computer-readable medium described herein, the scheduling priority configuration indicates a same priority associated with the logical channel of the set of logical channels for the access link and the sidelink.

In some examples of the method, apparatuses, and non-transitory computer-readable medium described herein, the scheduling priority configuration indicates a first priority associated with the access link and the logical channel of the set of logical channels, the first priority being different from a second priority associated with the sidelink and the logical channel of the set of logical channels.

Some examples of the method, apparatuses, and non-transitory computer-readable medium described herein may further include operations, features, means, or instructions for identifying a transport block configuration for the set of logical channels, the transport block configuration indicating one or more transport block sizes for the access link, or the sidelink, or both, associated with each logical channel of the set of logical channels.

In some examples of the method, apparatuses, and non-transitory computer-readable medium described herein, the transport block configuration indicates a maximum transport block size for the access link, or the sidelink, or both associated with each logical channel of the set of logical channels.

In some examples of the method, apparatuses, and non-transitory computer-readable medium described herein, the transport block configuration indicates a minimum transport block size for the access link, or the sidelink, or both associated with each logical channel of the set of logical channels.

A method for wireless communication at a base station is described. The method may include transmitting, to a UE, a logical channel configuration for a set of logical channels at the UE, the logical channel configuration indicating whether each logical channel of the set of logical channels is configured to use an access link, or a sidelink, or both and receiving a message including available data for a logical channel of the set of logical channels at the UE, where the message including the available data is received on the access link or the sidelink, based on the logical channel configuration for the logical channel.

An apparatus for wireless communication at a base station is described. The apparatus may include a processor, memory coupled with the processor, and instructions stored in the memory. The instructions may be executable by the processor to cause the apparatus to transmit, to a UE, a logical channel configuration for a set of logical channels at the UE, the logical channel configuration indicating whether each logical channel of the set of logical channels is configured to use an access link, or a sidelink, or both and receive a message including available data for a logical channel of the set of logical channels at the UE, where the message including the available data is received on the access link or the sidelink, based on the logical channel configuration for the logical channel.

Another apparatus for wireless communication at a base station is described. The apparatus may include means for transmitting, to a UE, a logical channel configuration for a set of logical channels at the UE, the logical channel configuration indicating whether each logical channel of the set of logical channels is configured to use an access link, or a sidelink, or both and means for receiving a message including available data for a logical channel of the set of logical channels at the UE, where the message including the available data is received on the access link or the sidelink, based on the logical channel configuration for the logical channel.

A non-transitory computer-readable medium storing code for wireless communication at a base station is described. The code may include instructions executable by a processor to transmit, to a UE, a logical channel configuration for a set of logical channels at the UE, the logical channel configuration indicating whether each logical channel of the set of logical channels is configured to use an access link, or a sidelink, or both and receive a message including available data for a logical channel of the set of logical channels at the UE, where the message including the available data is received on the access link or the sidelink, based on the logical channel configuration for the logical channel.

In some examples of the method, apparatuses, and non-transitory computer-readable medium described herein, transmitting the logical channel configuration may include operations, features, means, or instructions for transmitting, to the UE, a logical channel prioritization restriction configuration associating each logical channel of the set of logical channels at the UE with the access link, the sidelink, or both.

In some examples of the method, apparatuses, and non-transitory computer-readable medium described herein, transmitting the logical channel configuration may include operations, features, means, or instructions for transmitting, to the UE, an uplink control channel resource configuration identifying a set of resources for a scheduling request on the access link, the sidelink, or both.

Some examples of the method, apparatuses, and non-transitory computer-readable medium described herein may further include operations, features, means, or instructions for receiving the scheduling request from the UE on the set of resources, where the set of resources may be based on the available data for the logical channel of the set of logical channels and one or more scheduling request configurations mapped to the logical channel and transmitting, to the UE, a resource grant for transmitting the available data, the resource grant allocating resources on the access link, or the sidelink, or both, based on a logical channel prioritization restriction configuration and the logical channel, where the message including the available data may be received based on the resource grant.

In some examples of the method, apparatuses, and non-transitory computer-readable medium described herein, the message includes multiplexed data for one or more logical channels of the set of logical channels of the UE, the multiplexed data being based on a scheduling priority configuration for the one or more logical channels.

Some examples of the method, apparatuses, and non-transitory computer-readable medium described herein may further include operations, features, means, or instructions for receiving, from the UE, a buffer status report indicating that data may be available for one or more logical channels of the set of logical channels associated with the UE on the access link or the sidelink based on the logical channel configuration and the logical channel, where receiving the scheduling request from the UE may be based on the buffer status report.

Some examples of the method, apparatuses, and non-transitory computer-readable medium described herein may further include operations, features, means, or instructions for transmitting the one or more scheduling request configurations that indicate uplink control channel resources on the access link, uplink control channel resources on the sidelink, or both, where the scheduling request may be received on the uplink control channel resources on the access link or the uplink control channel resources on the sidelink based on the logical channel being associated with the access link, or the sidelink, or both.

Some examples of the method, apparatuses, and non-transitory computer-readable medium described herein may further include operations, features, means, or instructions for transmitting, to the UE, a scheduling priority configuration for the set of logical channels, the scheduling priority configuration indicating a priority associated with each logical channel of the set of logical channels for the access link, or the sidelink, or both.

Some examples of the method, apparatuses, and non-transitory computer-readable medium described herein may further include operations, features, means, or instructions for transmitting a transport block configuration for the set of logical channels, the transport block configuration indicating one or more transport block sizes for the access link, or the sidelink, or both associated with each logical channel of the set of logical channels.

DETAILED DESCRIPTION

Figure 1:
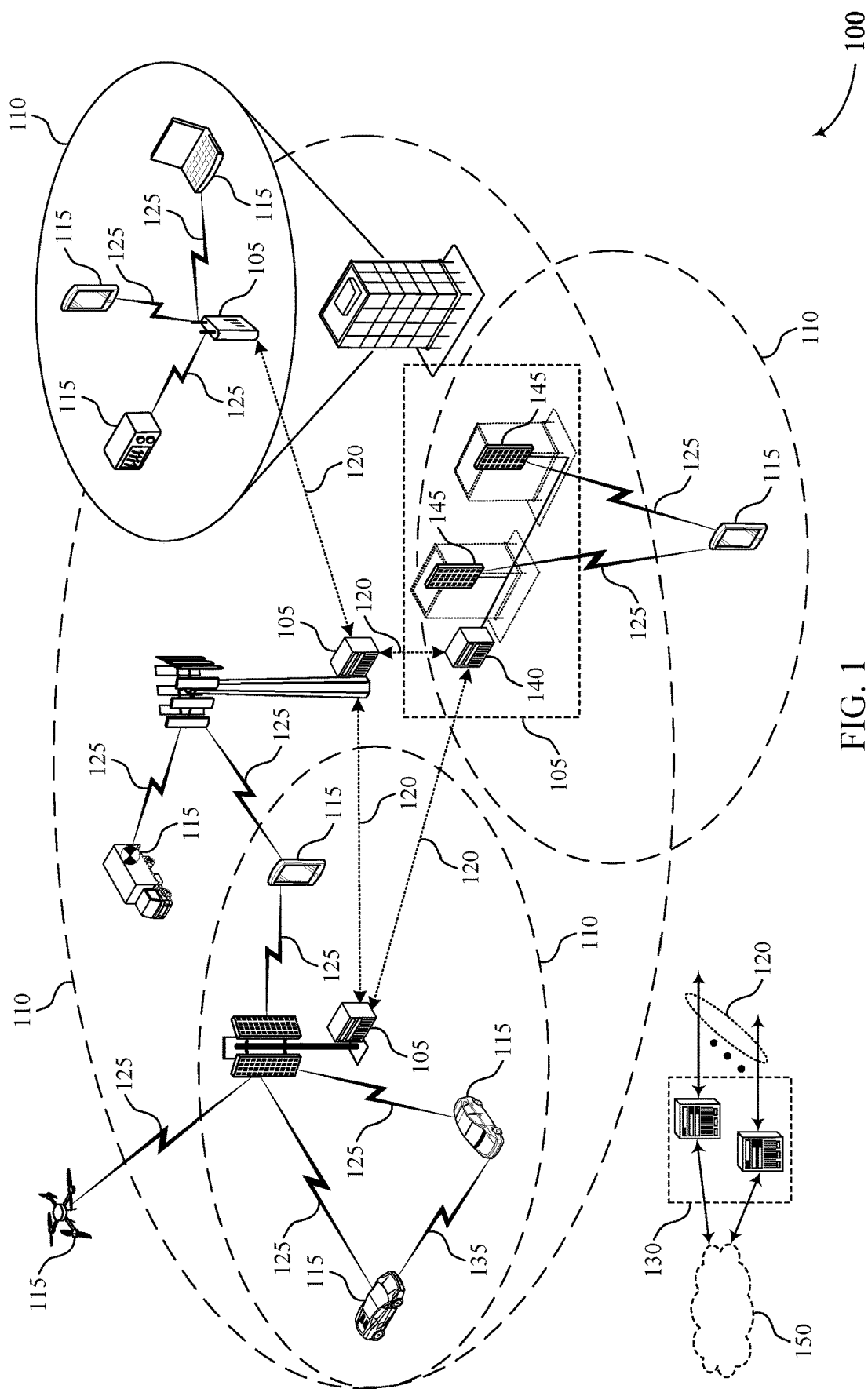
FIG. 1 illustrates an example of a wireless communications system in accordance with aspects of the present disclosure.

Some wireless communication systems, such as fifth generation (5G) New Radio (NR) systems, support wireless devices establishing both an access link (e.g., a Uu interface) and a sidelink (e.g., a PC5 interface). For example, a user equipment (UE) may establish an access link with a base station and a sidelink (e.g., a sidelink communication link) with another UE. In some cases, a UE may establish an access link with a base station and may establish a sidelink with another UE which operates as a relay (e.g., which has an access link with the same or different base station as the UE) such that the UE may communicate with a network via either the access link, or the sidelink, or both. In some cases, devices may use a sidelink to extend a coverage area. For example, a UE may establish a sidelink with another UE (e.g., a relay UE) having an access link with a base station for which the UE is out of coverage. Accordingly, the UE may be able to communicate with the base station for which the UE is out of coverage using the sidelink with the relay UE.

In some cases, the access link, being a direct connection between a UE and a base station, may support low-latency communications and may accordingly be suitable for time- or delay-sensitive communications. The sidelink may exhibit relatively higher latency than the access link, but because the sidelink may experience improved channel conditions compared to the access link (e.g., if a sidelink is being used to extend coverage), the sidelink may be suitable for communications with a high data throughput. Accordingly, due to different types of data that may be sent over the access link or the sidelink, it may be advantageous to utilize techniques whereby traffic is steered between the access link and the sidelink.

One such method for traffic steering may include a UE determining to send data via an access link or a sidelink based on a logical channel configuration for logical channels at the UE. For example, the UE may receive (e.g., from a base station) a logical channel configuration indicating whether each logical channel at the UE is configured to use the access link, the sidelink, or both. In some examples, the logical channel configuration may include a logical channel prioritization restriction configuration associating each logical channel with the access link, the sidelink, or both. The UE may determine that data is available for one or more logical channels and may transmit an associated scheduling request on the access link, the sidelink, or both. In some examples, the logical channel configuration may indicate an uplink control channel resource configuration allocating resources (e.g., a configuration for physical uplink control channel (PUCCH) resources, a configuration for physical sidelink control channel (PSCCH) resources, or the like) for transmitting scheduling requests associated with the logical channels on the access link, the sidelink, or both. In response to the scheduling request, the UE may receive an uplink grant allocating resources for the UE to transmit the available data on the access link, the sidelink, or both. Accordingly, based on the uplink grant and the logical channel configuration, the UE may transmit the available data on the access link, the sidelink, or both.

In some examples, the UE may receive (e.g., from a base station) additional configuration information which may be used to determine which link the UE is to transmit data. For example, the UE may receive scheduling priority configuration for each logical channel associated with the access link, the sidelink, or both. Similarly, the UE may receive a range of transport block sizes or a threshold transport block size (e.g., a maximum size, a minimum size, etc.) associated with the access link, the sidelink, or both.

Additionally or alternatively, the UE may generate a buffer status report indicating logical channels for which data is available. Based on the buffer status report, the UE may determine which, if any, logical channels are restricted to either the access link or the sidelink. For example, if the UE communicates with a first base station via the access link and a second base station via the sidelink, the UE may determine that at least a logical channel, or data available on the logical, is restricted to either the first base station or the second base station and may transmit the data accordingly. Implementing traffic steering techniques as described in the present disclosure may lead to increased efficiency, or reduced latency, among other benefits.

UEs capable of supporting the traffic steering techniques described herein may experience improved communications efficiency through routing data via the access link or sidelink, among other benefits. Additionally, the techniques employed by the described UEs may provide benefits and enhancements to the operation of the UEs, including enhanced medium access for a UE. For example, operations performed by the UEs may provide improvements to wireless operations and may further provide time and power savings for wireless communications. In some examples, the UEs may achieve high reliability and low latency communications, among other examples, in accordance with aspects of the present disclosure (e.g., where different traffic types may be steered to a link configured for communications efficiency). The described techniques may thus include features for improvements to power consumption, spectral efficiency, increased data rates and, in some examples, may promote enhanced efficiency for high reliability and low latency operations, among other benefits.

Aspects of the disclosure are initially described in the context of wireless communications systems. Aspects of the disclosure are further described with respect to a process flow in a system. Aspects of the disclosure are further illustrated by and described with reference to apparatus diagrams, system diagrams, and flowcharts that relate to techniques for traffic steering between access links and sidelinks in wireless communications systems.

FIG. 1 illustrates an example of a wireless communications system 100 in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some examples, the wireless communications system 100 may support devices establishing both an access link (e.g., a Uu interface) and a sidelink (e.g., a PC5 interface). For example, a UE 115 may establish an access link with a base station 105 and may establish a sidelink with another UE 115 which operates as a relay such that the UE 115 has an access link with the base station 105. In some examples, the UE 115 may establish multiple sidelinks with other UEs 115. Accordingly, the UE 115 may communicate with the base station 105 over the access link, the sidelink, or both. In some other cases, devices may use a sidelink to extend a coverage area 110. For example, a UE 115 may be outside of a coverage area of a base station 105, and the UE 115 may establish a sidelink with another UE 115 which acts as a relay to the base station 105 for which the UE 115 is out of coverage, thereby extending the coverage of the base station 105. In some cases, a UE 115 having both an access link and sidelink may utilize the described techniques for steering traffic between the access link and the sidelink, which may be based on the type of data available at the UE for transmission to the network.

For example, to facilitate traffic steering between access links and sidelinks, a base station 105 may transmit a logical channel configuration to a UE 115 indicating whether logical channels at the UE 115 are configured to use an access link, a sidelink, or both. In some examples, the logical channel configuration may include logical channel prioritization restrictions associating each logical channel with the access link, the sidelink, or both. Additionally or alternatively, the logical channel configuration may include uplink control channel resource configurations or scheduling request configurations indicating whether logical channels are to transmit scheduling requests on the access link, the sidelink, or both.

The UE 115 may determine that data is available for one or more logical channels at the UE 115 (e.g., may generate a buffer status report indicating the available data). The UE 115 may transmit scheduling requests associated with the logical channels for which data is available on the access link, the sidelink, or both, based on the logical channel configuration received from the base station 105. In response, the base station 105 may transmit an uplink grant allocating resources for the UE 115 to transmit the available data and the UE 115 may transmit the available data on the access link, the sidelink, or both based on the uplink grant. Implementing aspects of the wireless communications system 100 may lead to reduced latency and increased efficiency, among other benefits.

Figure 2A:
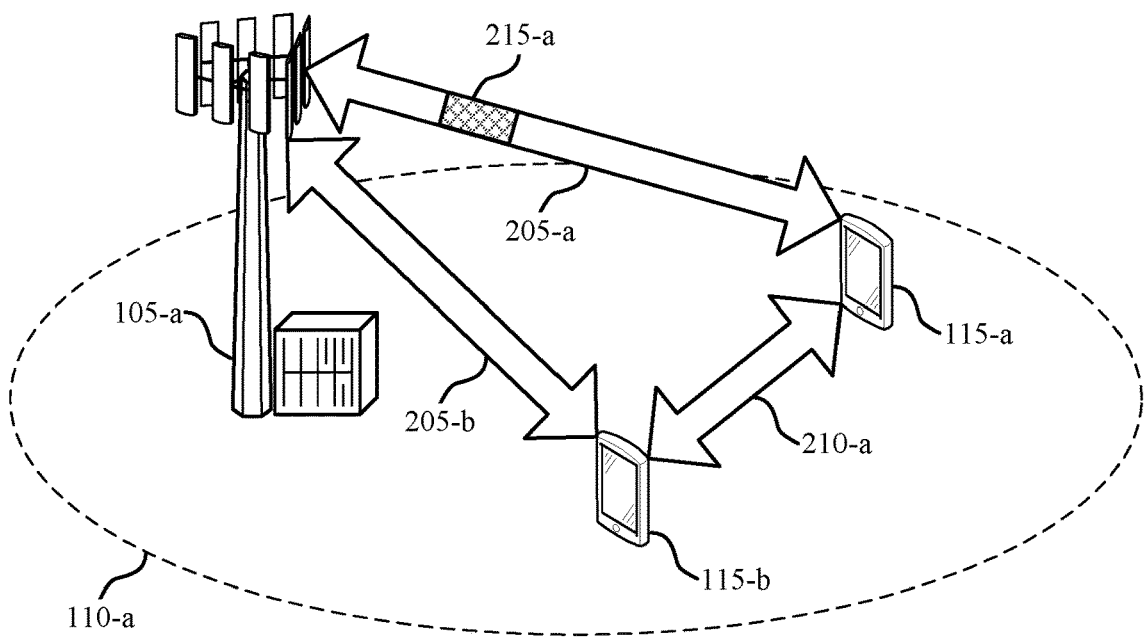
FIGS. 2A and 2B illustrate examples of wireless communications systems in accordance with aspects of the present disclosure.
Figure 2B:
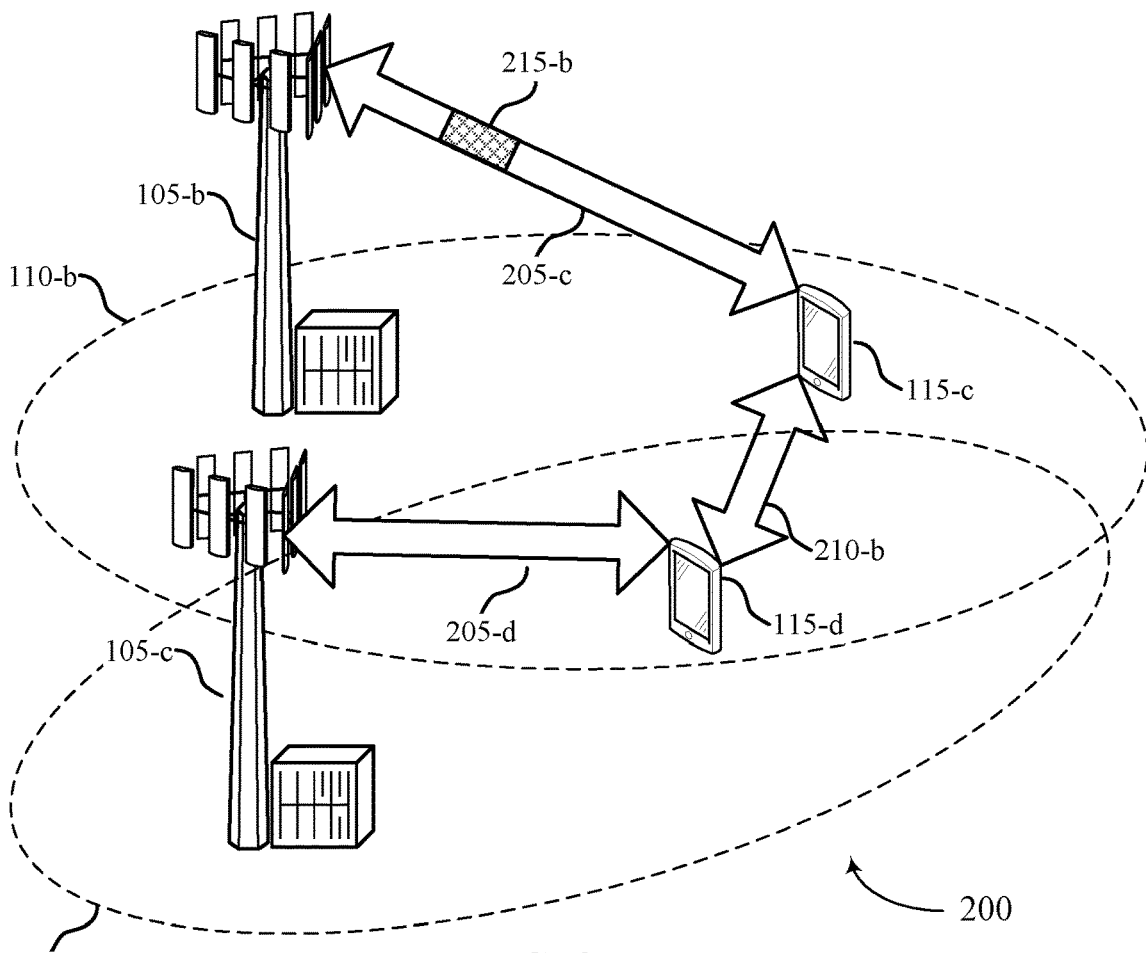

FIGS. 2A and 2B illustrate examples of wireless communications systems 200-*a* and 200-*b* in accordance with one or more aspects of the present disclosure. In some examples, the wireless communications systems 200-*a* and 200-*b* may implement aspects of a wireless communications system 100 as described with reference to FIG. 1. The wireless communications systems 200-*a* and 200-*b* may support efficient techniques for routing traffic over one or both of an access link and sidelink.

With respect to the example of FIG. 2A, the wireless communications system 200-*a* may include a UE 115-*a* and a UE 115-*b* which may be examples of a UE 115 as described with respect to FIG. 1. The wireless communications system 200-*a* may also include a base station 105-*a*, which may be an example of a base station 105 described with respect to FIG. 1. The base station 105-*a* may be associated with a cell which provides wireless communications service within a respective coverage area 110-*a*. The UE 115-*a* and the base station 105-*a* may communicate information via an access link 205-*a*. Similarly, the UE 115-*b* and the base station 105-*a* may communicate information via an access link 205-*b*. The UE 115-*a* and the UE 115-*b* may communicate information via a sidelink 210-*a*. Accordingly, the UE 115-*a* may communicate with the base station 105-*a* using either the access link 205-*a* or the sidelink 210-*a* (e.g., using the UE 115-*b* as a relay). In some examples, it may be advantageous for the wireless communications system 200-*a* to implement techniques for the UE 115-*a* to steer traffic between the access link 205-*a* and the sidelink 210-*a*.

One such technique may include the base station 105-*a* transmitting a logical channel configuration 215-*a* to the UE 115-*a*. In some examples, the base station 105-*a* may transmit the logical channel configuration 215-*a* to the UE 115-*a* via the relay UE 115-*b* (e.g., on the access link 205-*b*) such that UE 115-*a* receives the logical channel configuration 215-*a* using the sidelink 210-*a*. The logical channel configuration 215-*a* may indicate whether each logical channel at the UE 115-*a* is configured to use the access link 205-*a*, the sidelink 210-*a*, or both. In some examples, the logical channel configuration 215-*a* may include a logical channel prioritization restriction configuration associating each logical channel with the access link 205-*a*, the sidelink 210-*a*, or both. For example, a first logical channel (e.g., signaling radio bearer zero (SRB0)) may be configured to use the access link 205-*a*. Similarly, an enhanced mobile broadband (eMBB) logical channel may be configured to use the access link 205-*a* if a resource grant includes unused resources.

Additionally or alternatively, the logical channel configuration 215-*a* may map each logical channel to one or more scheduling request configurations. In some example, the logical channel configuration 215-*a* may include a control channel resource configuration (e.g., an uplink control channel resource configuration or a sidelink control channel resource configuration) which allocates resources for the UE 115-*a* to transmit scheduling requests on the access link 205-*a*, the sidelink 210-*a*, or both. For example, PUCCH resources may be configured on the access link 205-*a*, but the logical channel configuration 215-*a* may indicate two scheduling request configurations: one scheduling request configuration for logical channels configured to use the access link 205-*a*; and another scheduling request configuration for logical channels configured to use the sidelink 210-*a*. In another example, control channel resources may be configured on both the access link 205-*a* (e.g., PUCCH resources) and the sidelink 210-*a* (e.g., PSCCH resources), and the logical channel configuration 215-*a* may indicate two scheduling request configurations: a first scheduling request configuration for the access link 205-*a* and a second scheduling request configuration for the sidelink 210-*a*. In such an example, logical channels configured to use the access link 205-*a* may correspond to scheduling requests on the access link 205-*a* and logical channels configured to use the sidelink 210-*a* may correspond to scheduling requests on the sidelink 210-*a*. In such cases, the base station 105-*a* may receive a scheduling request from the UE 115-*a*, and the base station 105-*a* may know which logical channel the scheduling request is for based on the resources used for the scheduling request and the mapping between the scheduling request configuration and the logical channel. In some examples, if a logical channel is configured to use both the access link 205-*a* and the sidelink 210-*a*, the UE 115-*a* may determine whether to transmit scheduling requests associated with the logical channel on the access link 205-*a* or on the sidelink 210-*a*. For example, the UE 115-*a* may use various parameters or configurations for determining which link to use for transmitting the scheduling request.

The UE 115-*a* may determine that data is available on at least one logical channel at the UE 115-*a*. For example, the UE 115-*a* may generate a buffer status report indicating that data is available on one or more logical channels at the UE 115-*a*. Based on the buffer status report, the UE 115-*a* may transmit a scheduling request to the base station 105-*a* requesting resources for transmitting the available data. The UE 115-*a* may determine whether to transmit the scheduling request on the access link 205-*a*, the sidelink 210-*a*, or both, based on the logical channel configuration 215-*a*. The UE 115-*a* may also transmit the buffer status report (e.g., in a buffer status report MAC-control element (MAC-CE)) to the base station 105-*a*. In response to the scheduling request or the buffer status report, the base station 105-*a* may transmit an uplink grant to the UE 115-*a* scheduling resources for the UE 115-*a* to transmit the available data on the access link 205-*a* (e.g., via a physical uplink shared channel (PUSCH)), on the sidelink 210-*a* (e.g., via a physical sidelink shared channel (PSSCH)), or both. In some examples, the base station 105-*a* may determine resources to allocate for data transmission based on the logical channels with available data and based on the logical channel configuration 215-*a*. The UE 115-*a* may transmit a message including the available data on the resources allocated in the uplink grant.

In some examples, the base station 105-*a* may indicate additional configurations associated with the logical channels at the UE 115-*a* (e.g., included in the logical channel configuration 215-*a*). In some examples, the base station 105-*a* may configure a range of transport block sizes or threshold transport block sizes that each logical channel is to use on the access link 205-*a* and on the sidelink 210-*a*. For example, the base station 105-*a* may configure a minimum transport block size that a logical channel is to use on the access link 205-*a* or a maximum transport block size that a logical channel is to use on the sidelink 210-*a*. In some examples, the base station 105-*a* may configure a scheduling priority associated with each logical channel for the access link 205-*a* or the sidelink 210-*a*. For example, the base station 105-*a* may configure a first scheduling priority for a logical channel on the access link 205-*a* and a second scheduling priority for the logical channel on the sidelink 210-*a*. In some examples, the scheduling priority for the logical channel might be a same scheduling priority for the access link 205-*a* and the sidelink 210-*a*. In some examples, the UE 115-*a* may multiplex data onto a grant in an order based on the scheduling priorities associated with the logical channels to which the data applies. That is, data may be available for one or more logical channels configured to use the same link (e.g., the access link 205-*a* or the sidelink 210-*a*), and the UE 115-*a* may multiplex the available data for transmission on the corresponding link.

With respect to FIG. 2B, the wireless communications system 200-*b* may include a UE 115-*c*, a UE 115-*d*, a base station 105-*b*, and a base station 105-*b*, which may be examples of the corresponding devices described with reference to FIG. 1. The base station 105-*b* and the base station 105-*c* may be associated with cells that provide wireless communications services within respective coverage areas 110-*b* and 110-*c*. Accordingly, the UE 115-*c* and the base station 105-*b* may share information via the access link 205-*c*. In some examples, the UE 115-*c* may operate outside of the coverage area 110-*c* but may communicate with the base station 105-*c* using the UE 115-*d* (e.g., a relay UE 115-*d* which has an access link 205-*d* with the base station 105-*c*) via the sidelink 210-*b*. As such, the sidelink 210-*b*, using the UE 115-*d*, may be used to extend the coverage of the base station 105-*c*.

In the example of FIG. 2B, the base station 105-*b* may transmit a logical channel configuration 215-*b* to the UE 115-*c*. As described with reference to FIG. 2A, the UE 115-*c* may generate a buffer status report indicating that data is available for one or more logical channels at the UE 115-*c*. In some examples, a logical channel that triggers the buffer status report (e.g., the logical channel for which data is available) may be restricted to either the access link 205-*c* and the base station 105-*b* or the sidelink 210-*b* and the base station 105-*c*. Accordingly, a buffer status report MAC-CE transmitted by the UE 115-*c* may only include information associated with logical channels that may use the link on which the MAC-CE is transmitted (e.g., the access link 205-*b* or the sidelink 210-*b*). If the logical channel is configured to use either the access link 205-*b* or the sidelink 210-*b*, then the buffer status report may be sent on either link.

Further, UE 115-*c* may steer traffic over the access link 205- and/or the sidelink 210-*b* based on the logical channel configuration 215-*b*. Based on the logical channel configuration 215-*b* and determining that data is available for one or more logical channels, the UE 115-*c* may transmit scheduling requests associated with logical channels using the access link 205-*c*, the sidelink 210-*b*, or both, based on one or more scheduling request configurations. In response to the scheduling request, the base station 105-*b* (or base station 105-*c*) may transmit an uplink grant allocating resources for the UE 115-*c* to transmit the available data on the access link 205-*c*, the sidelink 210-*b*, or both, based on a logical channel prioritization restriction configuration and the logical channels to which the available data applies. The UE 115-*c* may transmit the available data based on the uplink grant, where data associated with some logical channel may be transmitted on the link for which the logical channel is configured to support. In some examples, the base station 105-*b* (or base station 105-*c*) may transmit additional configuration information (e.g., scheduling priorities, transport block sizes, or the like) which may be used in determining which link the UE 115-*c* is send data. Implementing aspects of the present disclosure may lead the wireless communications systems 200-*a* and 200-*b* to exhibit an increased efficiency, or a reduced latency, among other benefits.

Figure 3:
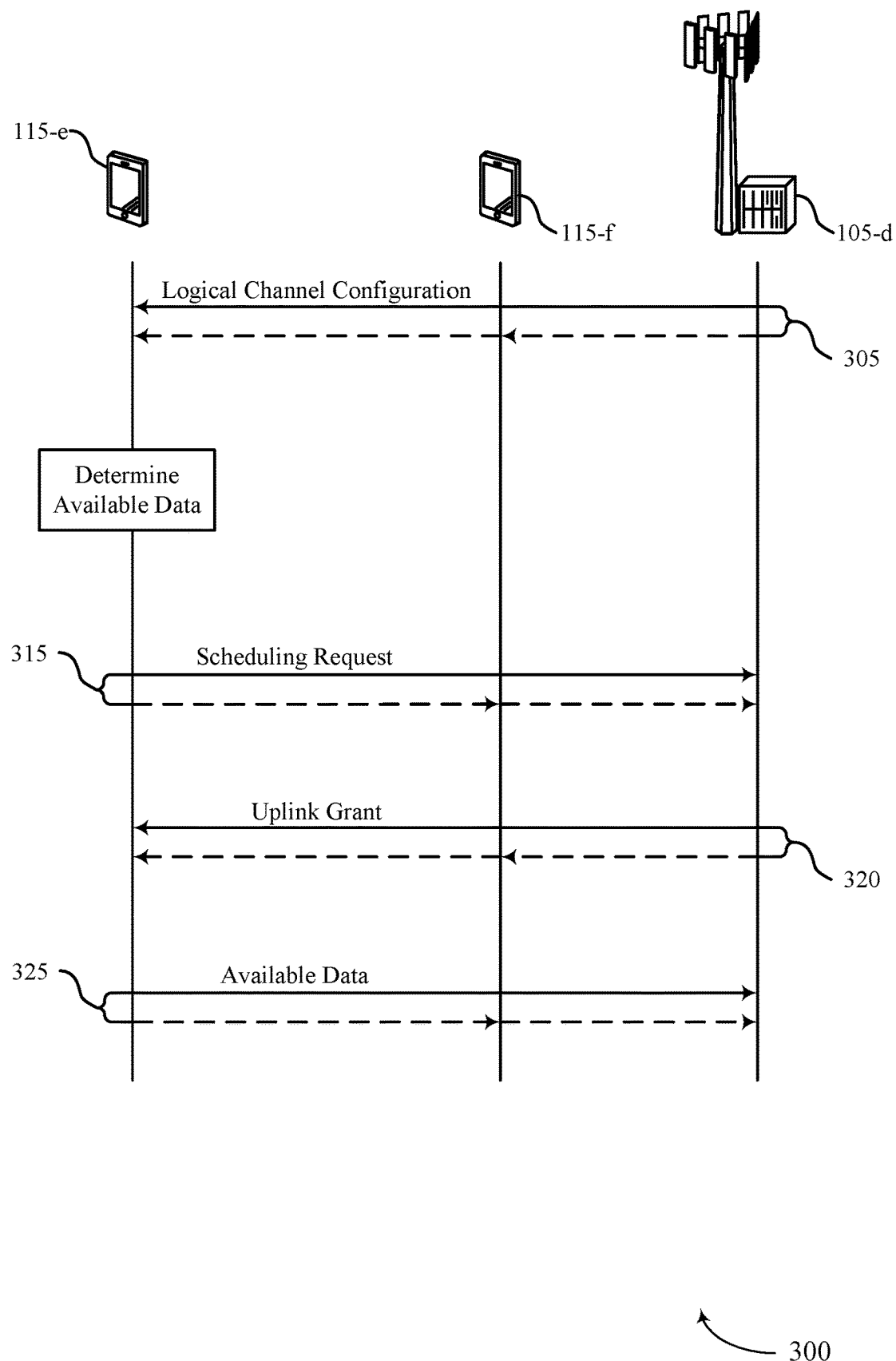
FIG. 3 illustrates an example of a process flow in a system in accordance with aspects of the present disclosure.

FIG. 3 illustrates an example of a process flow 300 in a system in accordance with one or more aspects of the wireless communications systems 100 or 200 as described with reference to FIGS. 1 and 2. The process flow 300 may include a UE 115-*e*, a UE 115-*f*, and a base station 105-*d* which may be examples of the corresponding devices described herein. The UE 115-*e* may communicate with the base station 105-*d* over either an access link (e.g., directly) or a sidelink using the UE 115-*f* as a relay. Alternative examples of the following may be implemented, where some processes are performed in a different order than described or are not performed at all. In some examples, processes may include additional features not mentioned below, or further processes may be added.

At 305, the base station 105-*d* may transmit, to the UE 115-*e*, a logical channel configuration indicating each logical channel at the UE 115-*e* to use the access link, the sidelink, or both. The base station 105-*d* may transmit the logical channel configuration on the access link or on the sidelink. In some examples, the logical channel configuration may indicate logical channel priority restriction configurations associating each logical channel with the access link, the sidelink, or both. Additionally or alternatively, the logical channel configuration may indicate one or more scheduling request configurations which the UE 115-*e* may use to determine whether to transmit scheduling requests for different logical channels on the access link, the sidelink, or both. For example, the logical channel configuration may indicate uplink control channel resources on which the UE 115-*e* may transmit scheduling requests.

At 310, the UE 115-e may determine that data is available for one or more logical channels at the UE 115-e. In some examples, determining that data is available may include generating a buffer status report at the UE 115-e indicating which logical channels have available data.

At 315, the UE 115-e may transmit a scheduling request to the base station 105-d based on which logical channels have available data. The UE 115-e may determine whether to transmit a scheduling request on the access link or the sidelink based on the logical channel configuration, scheduling request configurations, and the logical channels which have available data.

At 320, in response to the scheduling request, the base station 105-d may transmit an uplink grant allocating resources (e.g., on the access link, the sidelink, or both) for the UE 115-e to transmit any available data. The base station 105-d may determine whether to allocate resources on the access link or the sidelink based on the logical channel configuration. The base station may transmit the uplink grant on the access link or the sidelink.

At 325, the UE 115-e may transmit a message including any available to the base station 105-d. The UE 115-e may transmit the message on the access link, the sidelink, or both based on the resources allocated in the uplink grant received from the base station 105-d.

It is noted that, in the method described herein, the UE 115-e may communicate with a first base station 105 via the access link and a second base station 105 via the sidelink. In such examples, the UE 115-e may determine whether to transmit scheduling requests or data on the access link or the sidelink further based on any restrictions on which base station 105 data is restricted to for any logical channel at the UE 115-e. Implementing the process flow 300 may lead to an increased efficiency or a reduced latency in wireless communications systems.

Figure 4:
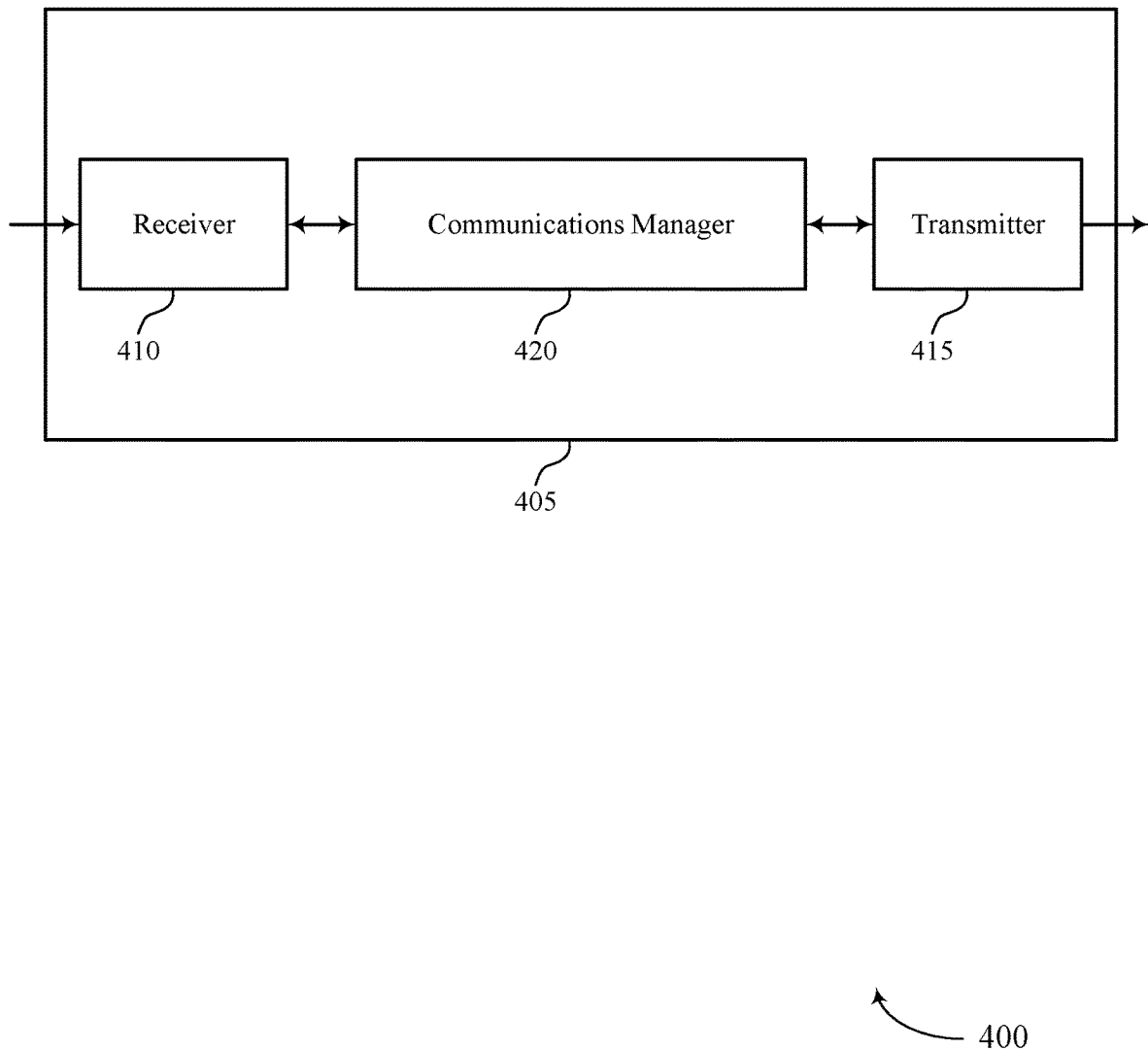
FIGS. 4 and 5 show block diagrams of devices in accordance with aspects of the present disclosure.

FIG. 4 shows a block diagram 400 of a device 405 in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for traffic steering between access links and sidelinks in wireless communications systems). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for traffic steering between access links and sidelinks in wireless communications systems). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of techniques for traffic steering between access links and sidelinks in wireless communications systems as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a UE in accordance with examples as disclosed herein. For example, the communications manager 420 may be configured as or otherwise support a means for receiving a logical channel configuration for a set of logical channels at the UE, the logical channel configuration indicating whether each logical channel of the set of logical channels is configured to use an access link, or a sidelink, or both. The communications manager 420 may be configured as or otherwise support a means for determining that a logical channel of the set of logical channels has available data. The communications manager 420 may be configured as or otherwise support a means for transmitting a message including the available data based on the determination, where the message including the available data is transmitted on the access link or the sidelink based on the logical channel configuration for the logical channel.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for traffic steering between access links and sidelinks such that the device 405 exhibits an increased efficiency of communications and usage of resources, a reduced processing, or a reduced power consumption, among other benefits.

Figure 5:
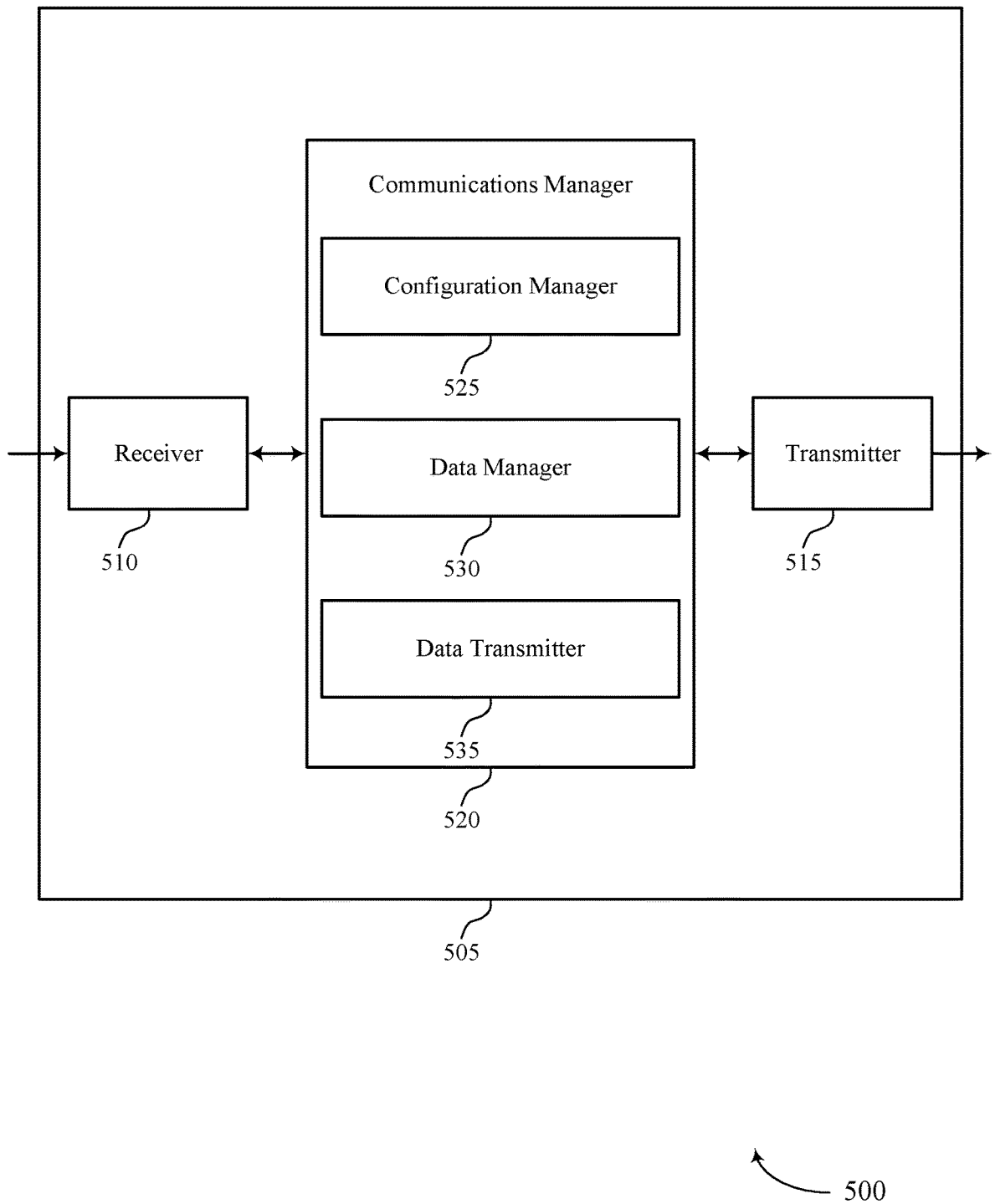

FIG. 5 shows a block diagram 500 of a device 505 in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for traffic steering between access links and sidelinks in wireless communications systems). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for traffic steering between access links and sidelinks in wireless communications systems). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of techniques for traffic steering between access links and sidelinks in wireless communications systems as described herein. For example, the communications manager 520 may include a configuration manager 525, a data manager 530, a data transmitter 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. The configuration manager 525 may be configured as or otherwise support a means for receiving a logical channel configuration for a set of logical channels at the UE, the logical channel configuration indicating whether each logical channel of the set of logical channels is configured to use an access link, or a sidelink, or both. The data manager 530 may be configured as or otherwise support a means for determining that a logical channel of the set of logical channels has available data. The data transmitter 535 may be configured as or otherwise support a means for transmitting a message including the available data based on the determination, where the message including the available data is transmitted on the access link or the sidelink based on the logical channel configuration for the logical channel.

Figure 6:
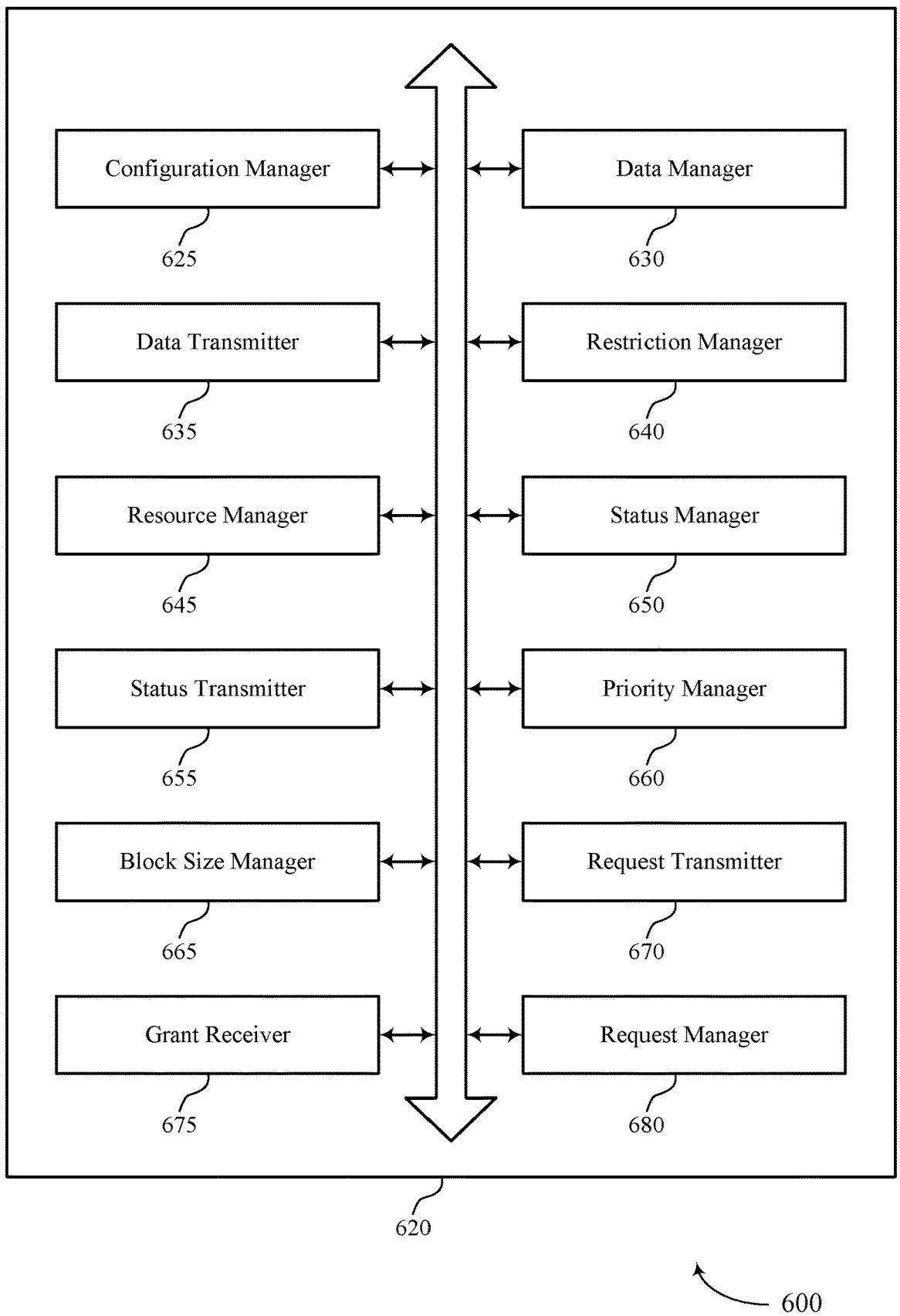
FIG. 6 shows a block diagram of a communications manager in accordance with aspects of the present disclosure.

FIG. 6 shows a block diagram 600 of a communications manager 620 in accordance with aspects of the present disclosure. The communications manager 620 may be an example of aspects of a communications manager 420, a communications manager 520, or both, as described herein. The communications manager 620, or various components thereof, may be an example of means for performing various aspects of techniques for traffic steering between access links and sidelinks in wireless communications systems as described herein. For example, the communications manager 620 may include a configuration manager 625, a data manager 630, a data transmitter 635, a restriction manager 640, a resource manager 645, a status manager 650, a status transmitter 655, a priority manager 660, a block size manager 665, a request transmitter 670, a grant receiver 675, a request manager 680, or any combination thereof. Each of these components may communicate, directly or indirectly, with one another (e.g., via one or more buses).

The communications manager 620 may support wireless communication at a UE in accordance with examples as disclosed herein. The configuration manager 625 may be configured as or otherwise support a means for receiving a logical channel configuration for a set of logical channels at the UE, the logical channel configuration indicating whether each logical channel of the set of logical channels is configured to use an access link, or a sidelink, or both. The data manager 630 may be configured as or otherwise support a means for determining that a logical channel of the set of logical channels has available data. The data transmitter 635 may be configured as or otherwise support a means for transmitting a message including the available data based on the determination, where the message including the available data is transmitted on the access link or the sidelink based on the logical channel configuration for the logical channel.

In some examples, the restriction manager 640 may be configured as or otherwise support a means for identifying a logical channel prioritization restriction configuration based on the logical channel configuration, the logical channel prioritization restriction configuration associating each logical channel of the set of logical channels with the access link, the sidelink, or both, where transmitting the message including the available data is based on the logical channel prioritization restriction configuration.

In some examples, the resource manager 645 may be configured as or otherwise support a means for identifying an uplink control channel resource configuration based on the logical channel configuration, the uplink control channel resource configuration indicating a respective set of resources for transmitting one or more scheduling requests on the access link, the sidelink, or both, based on data for one or more logical channels of the set of logical channels. For example, a first set of resources may be used for a first scheduling request and a second, different set of resources may be used for a second, different scheduling request.

In some examples, the request transmitter 670 may be configured as or otherwise support a means for transmitting a scheduling request using the set of resources, where the set of resources are selected based on the available data for the logical channel and one or more scheduling request configurations mapped to the logical channel.

In some examples, the grant receiver 675 may be configured as or otherwise support a means for receiving a resource grant for transmitting the available data, the resource grant allocating resources on the access link, or the sidelink, or both, based on a logical channel prioritization restriction configuration and the logical channel, where the resource grant is received based on the scheduling request.

In some examples, the request manager 680 may be configured as or otherwise support a means for determining that each scheduling request configuration of the one or more scheduling request configurations indicates uplink control channel resources on the access link, uplink control channel resources on the sidelink, or both. In some examples, the resource manager 645 may be configured as or otherwise support a means for selecting the set of resources from the uplink control channel resources on the access link or the uplink control channel resources on the sidelink based on the logical channel being associated with the access link, or the sidelink, or both.

In some examples, the status manager 650 may be configured as or otherwise support a means for generating a buffer status report indicating that data is available for one or more logical channels of the set of logical channels, where the data available for the one or more logical channels includes the available data for the logical channel. In some examples, the status transmitter 655 may be configured as or otherwise support a means for transmitting the buffer status report on the access link or the sidelink, where transmitting a scheduling request is based on the buffer status report.

In some examples, the data manager 630 may be configured as or otherwise support a means for determining that the available data for the one or more logical channels of the set of logical channels is restricted to one of the access link or the sidelink based on a logical channel prioritization restriction configuration and the one or more logical channels, where transmitting the buffer status report is based on determining that the available data for the one or more logical channels of the set of logical channels is restricted to one of the access link or the sidelink.

In some examples, to support transmitting the buffer status report, the status transmitter 655 may be configured as or otherwise support a means for transmitting the buffer status report on the access link based on the logical channel being restricted to the access link based on the logical channel prioritization restriction configuration, the buffer status report including an indication of data available for logical channels associated with the access link.

In some examples, to support transmitting the buffer status report, the status transmitter 655 may be configured as or otherwise support a means for transmitting the buffer status report on the sidelink based on the logical channel being restricted to the sidelink based on the logical channel prioritization restriction configuration, the buffer status report including an indication of data available for logical channels associated with the sidelink.

In some examples, to support transmitting the buffer status report, the status transmitter 655 may be configured as or otherwise support a means for transmitting the buffer status report to a base station, where the access link and the sidelink are both associated with the base station.

In some examples, to support transmitting the buffer status report, the status transmitter 655 may be configured as or otherwise support a means for transmitting the buffer status report to a first base station or a second base station different from the first base station, where the access link is associated with the first base station and the sidelink is associated with the second base station.

In some examples, the priority manager 660 may be configured as or otherwise support a means for identifying a scheduling priority configuration for the set of logical channels based on the logical channel configuration, the scheduling priority configuration indicating a priority associated with each logical channel of the set of logical channels for the access link, or the sidelink, or both.

In some examples, to support transmitting the message including the available data, the data manager 630 may be configured as or otherwise support a means for multiplexing data for one or more logical channels based on the scheduling priority configuration for the one or more logical channels, the multiplexed data including the available data, where the one or more logical channels are associated with the access link, or the sidelink, or both, and where the message includes the multiplexed data.

In some examples, the scheduling priority configuration indicates a same priority associated with the logical channel of the set of logical channels for the access link and the sidelink.

In some examples, the scheduling priority configuration indicates a first priority associated with the access link and the logical channel of the set of logical channels, the first priority being different from a second priority associated with the sidelink and the logical channel of the set of logical channels.

In some examples, the block size manager 665 may be configured as or otherwise support a means for identifying a transport block configuration for the set of logical channels, the transport block configuration indicating one or more transport block sizes for the access link, or the sidelink, or both, associated with each logical channel of the set of logical channels.

In some examples, the transport block configuration indicates a threshold transport block size (e.g., a maximum transport block size) for the access link, or the sidelink, or both associated with each logical channel of the set of logical channels.

In some examples, the transport block configuration indicates a threshold transport block size (e.g., a minimum transport block size) for the access link, or the sidelink, or both associated with each logical channel of the set of logical channels.

Figure 7:
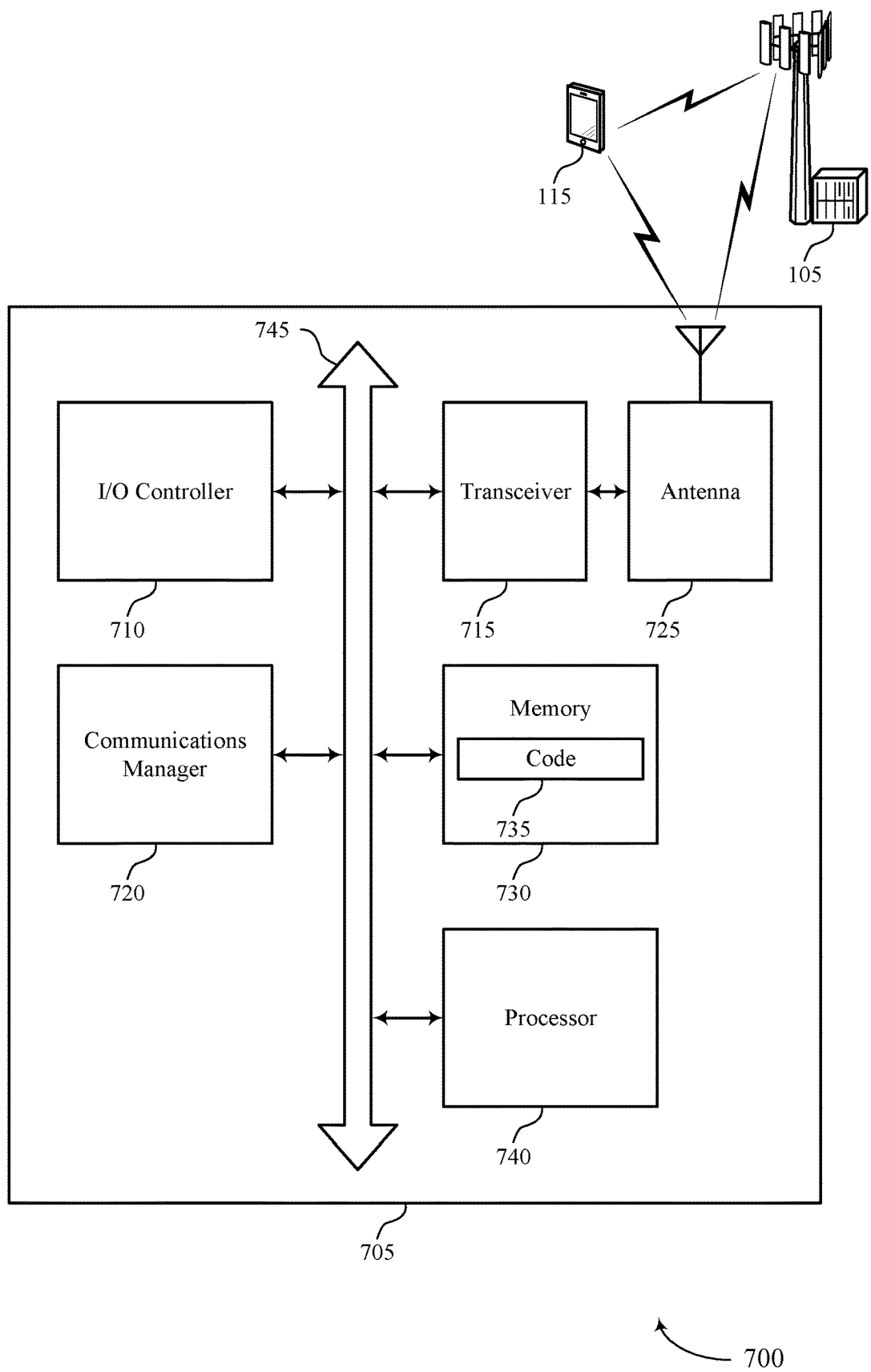
FIG. 7 shows a diagram of a system including a device in accordance with aspects of the present disclosure.

FIG. 7 shows a diagram of a system 700 including a device 705 in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for traffic steering between access links and sidelinks in wireless communications systems). For example, the device 705 or a component of the device 705 may include a processor 740 and memory 730 coupled to the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for receiving a logical channel configuration for a set of logical channels at the UE, the logical channel configuration indicating whether each logical channel of the set of logical channels is configured to use an access link, or a sidelink, or both. The communications manager 720 may be configured as or otherwise support a means for determining that a logical channel of the set of logical channels has available data. The communications manager 720 may be configured as or otherwise support a means for transmitting a message including the available data based on the determination, where the message including the available data is transmitted on the access link or the sidelink based on the logical channel configuration for the logical channel.

By including or configuring the communications manager 720 in accordance with examples as described herein, the device 705 may support techniques for traffic steering between access links and sidelinks such that the device 705 may exhibit an increased efficiency of communications and usage of resources, a reduced latency, a reduced power consumption, or an improved user experience, among other benefits.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for traffic steering between access links and sidelinks in wireless communications systems as described herein, or the processor 740 and the memory 730 may be otherwise configured to perform or support such operations.

Figure 8:
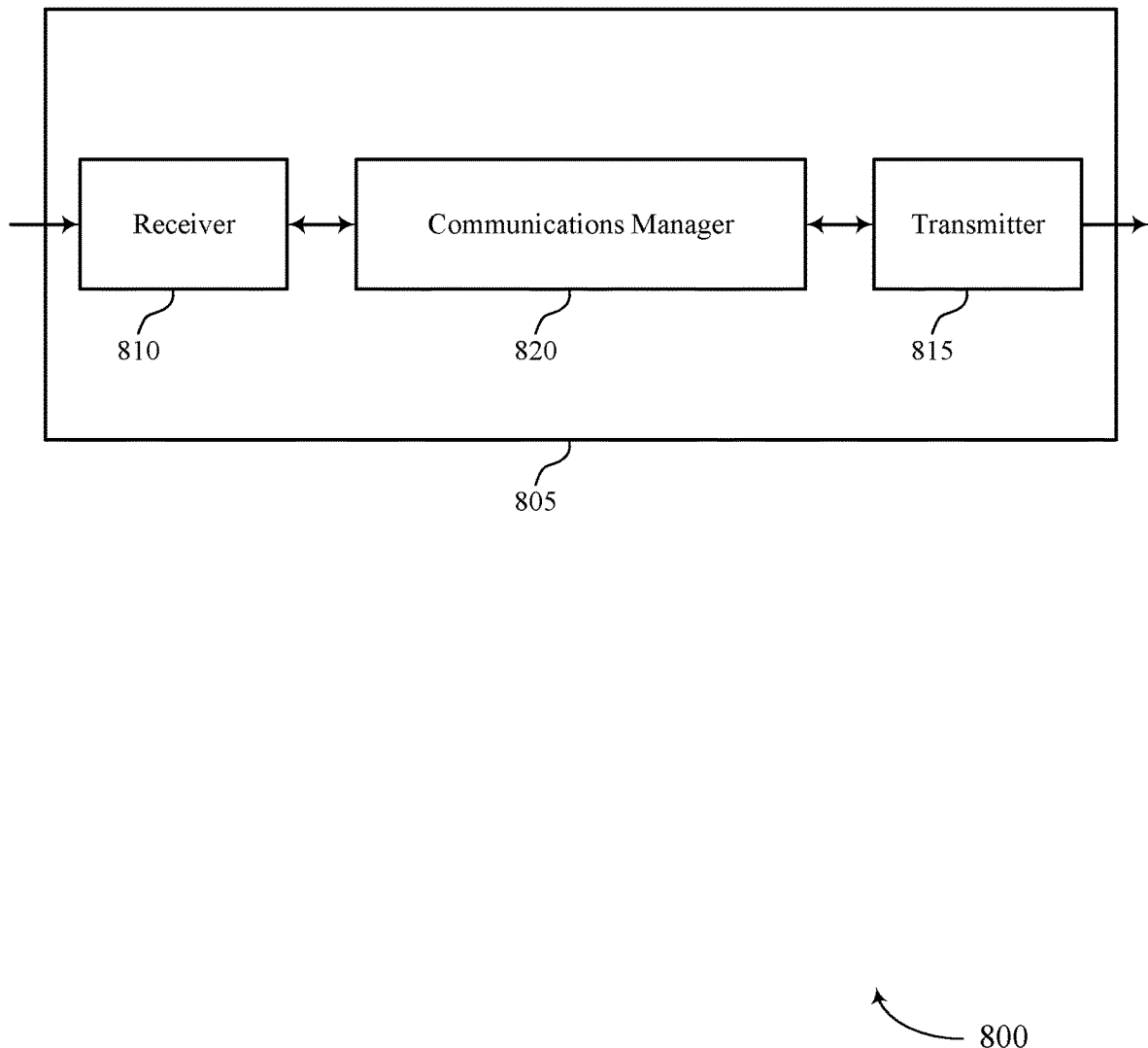
FIGS. 8 and 9 show block diagrams of devices in accordance with aspects of the present disclosure.

FIG. 8 shows a block diagram 800 of a device 805 in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for traffic steering between access links and sidelinks in wireless communications systems). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for traffic steering between access links and sidelinks in wireless communications systems). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of techniques for traffic steering between access links and sidelinks in wireless communications systems as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a base station in accordance with examples as disclosed herein. For example, the communications manager 820 may be configured as or otherwise support a means for transmitting, to a UE, a logical channel configuration for a set of logical channels at the UE, the logical channel configuration indicating whether each logical channel of the set of logical channels is configured to use an access link, or a sidelink, or both. The communications manager 820 may be configured as or otherwise support a means for receiving a message including available data for a logical channel of the set of logical channels at the UE, where the message including the available data is received on the access link or the sidelink, based on the logical channel configuration for the logical channel.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for traffic steering between access links and sidelinks such that the device 805 may exhibit an increased efficiency of communication and resource usage, a reduced latency, or a reduced power consumption, among other benefits.

Figure 9:
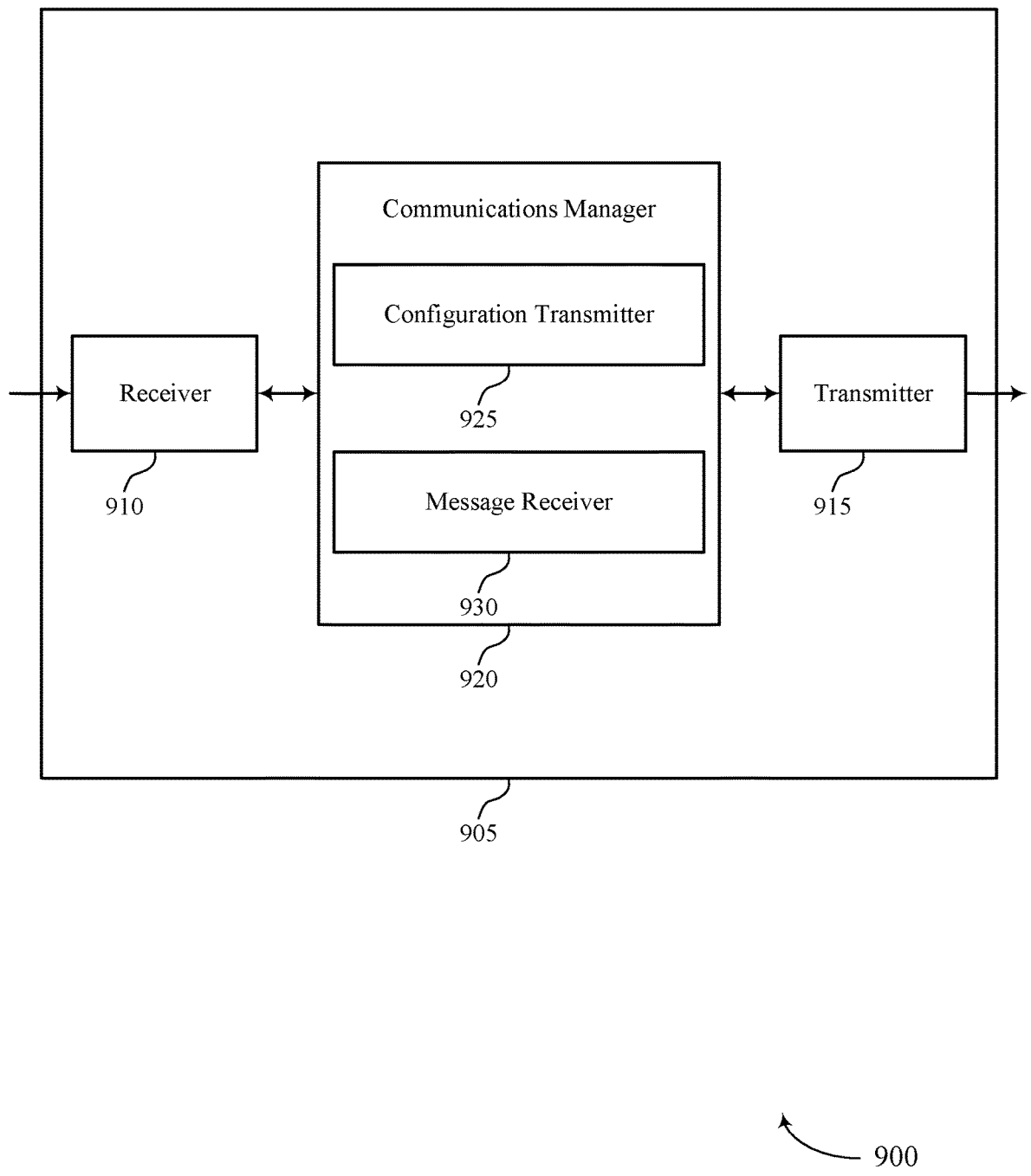

FIG. 9 shows a block diagram 900 of a device 905 in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for traffic steering between access links and sidelinks in wireless communications systems). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for traffic steering between access links and sidelinks in wireless communications systems). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of techniques for traffic steering between access links and sidelinks in wireless communications systems as described herein. For example, the communications manager 920 may include a configuration transmitter 925 a message receiver 930, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. The configuration transmitter 925 may be configured as or otherwise support a means for transmitting, to a UE, a logical channel configuration for a set of logical channels at the UE, the logical channel configuration indicating whether each logical channel of the set of logical channels is configured to use an access link, or a sidelink, or both. The message receiver 930 may be configured as or otherwise support a means for receiving a message including available data for a logical channel of the set of logical channels at the UE, where the message including the available data is received on the access link or the sidelink, based on the logical channel configuration for the logical channel.

Figure 10:
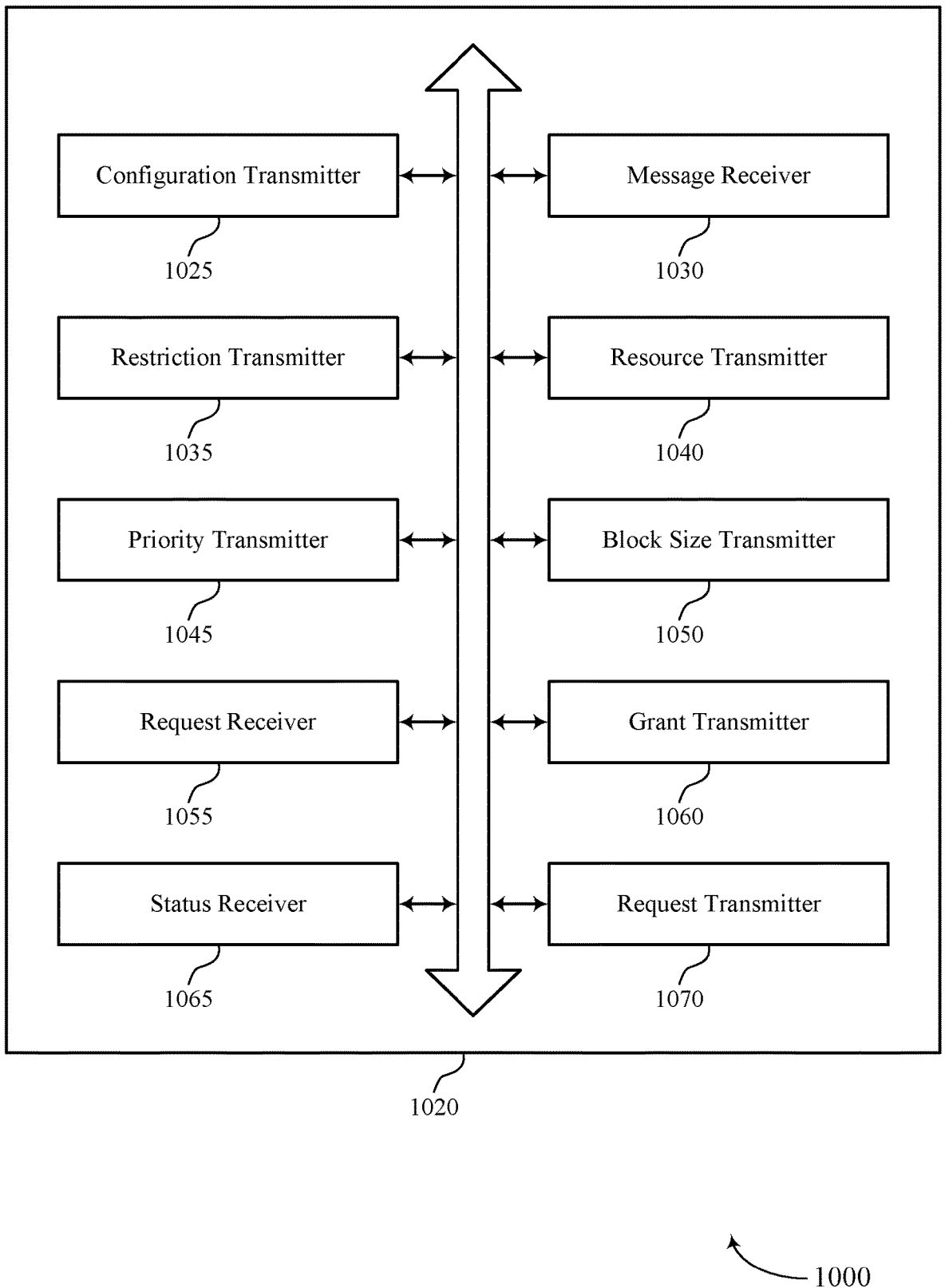
FIG. 10 shows a block diagram of a communications manager in accordance with aspects of the present disclosure.

FIG. 10 shows a block diagram 1000 of a communications manager 1020 in accordance with aspects of the present disclosure. The communications manager 1020 may be an example of aspects of a communications manager 820, a communications manager 920, or both, as described herein. The communications manager 1020, or various components thereof, may be an example of means for performing various aspects of techniques for traffic steering between access links and sidelinks in wireless communications systems as described herein. For example, the communications manager 1020 may include a configuration transmitter 1025, a message receiver 1030, a restriction transmitter 1035, a resource transmitter 1040, a priority transmitter 1045, a block size transmitter 1050, a request receiver 1055, a grant transmitter 1060, a status receiver 1065, a request transmitter 1070, or any combination thereof. Each of these components may communicate, directly or indirectly, with one another (e.g., via one or more buses).

The communications manager 1020 may support wireless communication at a base station in accordance with examples as disclosed herein. The configuration transmitter 1025 may be configured as or otherwise support a means for transmitting, to a UE, a logical channel configuration for a set of logical channels at the UE, the logical channel configuration indicating whether each logical channel of the set of logical channels is configured to use an access link, or a sidelink, or both. The message receiver 1030 may be configured as or otherwise support a means for receiving a message including available data for a logical channel of the set of logical channels at the UE, where the message including the available data is received on the access link or the sidelink, based on the logical channel configuration for the logical channel.

In some examples, to support transmitting the logical channel configuration, the restriction transmitter 1035 may be configured as or otherwise support a means for transmitting, to the UE, a logical channel prioritization restriction configuration associating each logical channel of the set of logical channels at the UE with the access link, the sidelink, or both.

In some examples, to support transmitting the logical channel configuration, the resource transmitter 1040 may be configured as or otherwise support a means for transmitting, to the UE, an uplink control channel resource configuration identifying a set of resources for a scheduling request on the access link, the sidelink, or both.

In some examples, the request receiver 1055 may be configured as or otherwise support a means for receiving the scheduling request from the UE on the set of resources, where the set of resources are based on the available data for the logical channel of the set of logical channels and one or more scheduling request configurations mapped to the logical channel. In some examples, the grant transmitter 1060 may be configured as or otherwise support a means for transmitting, to the UE, a resource grant for transmitting the available data, the resource grant allocating resources on the access link, or the sidelink, or both, based on a logical channel prioritization restriction configuration and the logical channel, where the message including the available data is received based on the resource grant.

In some examples, the message includes multiplexed data for one or more logical channels of the set of logical channels of the UE, the multiplexed data being based on a scheduling priority configuration for the one or more logical channels.

In some examples, the status receiver 1065 may be configured as or otherwise support a means for receiving, from the UE, a buffer status report indicating that data is available for one or more logical channels of the set of logical channels associated with the UE on the access link or the sidelink based on the logical channel configuration and the logical channel, where receiving the scheduling request from the UE is based on the buffer status report.

In some examples, the request transmitter 1070 may be configured as or otherwise support a means for transmitting the one or more scheduling request configurations that indicate uplink control channel resources on the access link, uplink control channel resources on the sidelink, or both, where the scheduling request is received on the uplink control channel resources on the access link or the uplink control channel resources on the sidelink based on the logical channel being associated with the access link, or the sidelink, or both.

In some examples, the priority transmitter 1045 may be configured as or otherwise support a means for transmitting, to the UE, a scheduling priority configuration for the set of logical channels, the scheduling priority configuration indicating a priority associated with each logical channel of the set of logical channels for the access link, or the sidelink, or both.

In some examples, the block size transmitter 1050 may be configured as or otherwise support a means for transmitting a transport block configuration for the set of logical channels, the transport block configuration indicating one or more transport block sizes for the access link, or the sidelink, or both associated with each logical channel of the set of logical channels.

Figure 11:
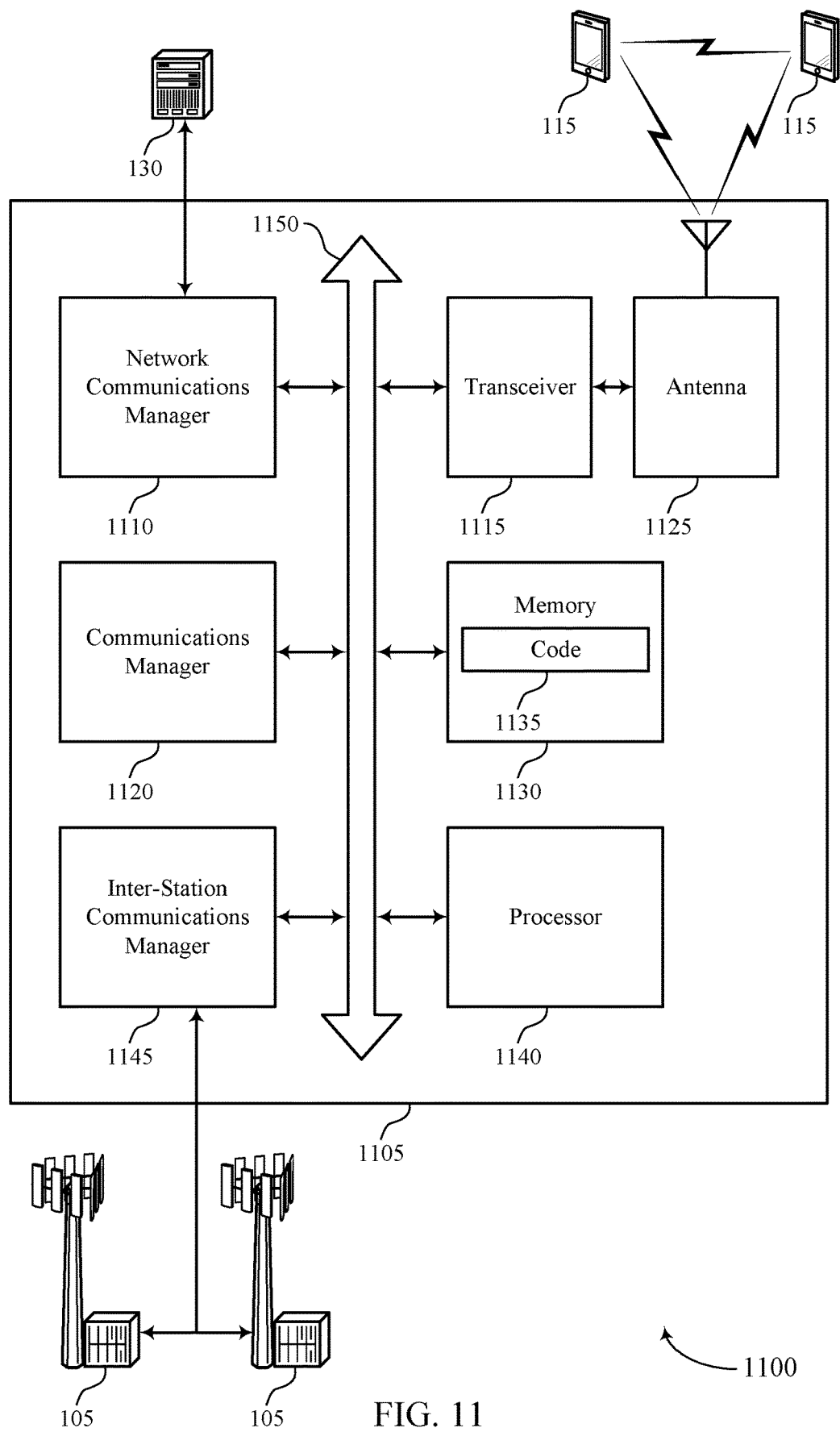
FIG. 11 shows a diagram of a system including a device in accordance with aspects of the present disclosure.

FIG. 11 shows a diagram of a system 1100 including a device 1105 in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for traffic steering between access links and sidelinks in wireless communications systems). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communication at a base station in accordance with examples as disclosed herein. For example, the communications manager 1120 may be configured as or otherwise support a means for transmitting, to a UE, a logical channel configuration for a set of logical channels at the UE, the logical channel configuration indicating whether each logical channel of the set of logical channels is configured to use an access link, or a sidelink, or both. The communications manager 1120 may be configured as or otherwise support a means for receiving a message including available data for a logical channel of the set of logical channels at the UE, where the message including the available data is received on the access link or the sidelink, based on the logical channel configuration for the logical channel.

By including or configuring the communications manager 1120 in accordance with examples as described herein, the device 1105 may support techniques for traffic steering between access links and sidelinks such that the device 1105 may exhibit an increased efficiency of communication and resource usage, a reduced latency, a reduced power consumption, or an improved coordination between devices, among other benefits.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of techniques for traffic steering between access links and sidelinks in wireless communications systems as described herein, or the processor 1140 and the memory 1130 may be otherwise configured to perform or support such operations.

Figure 12:
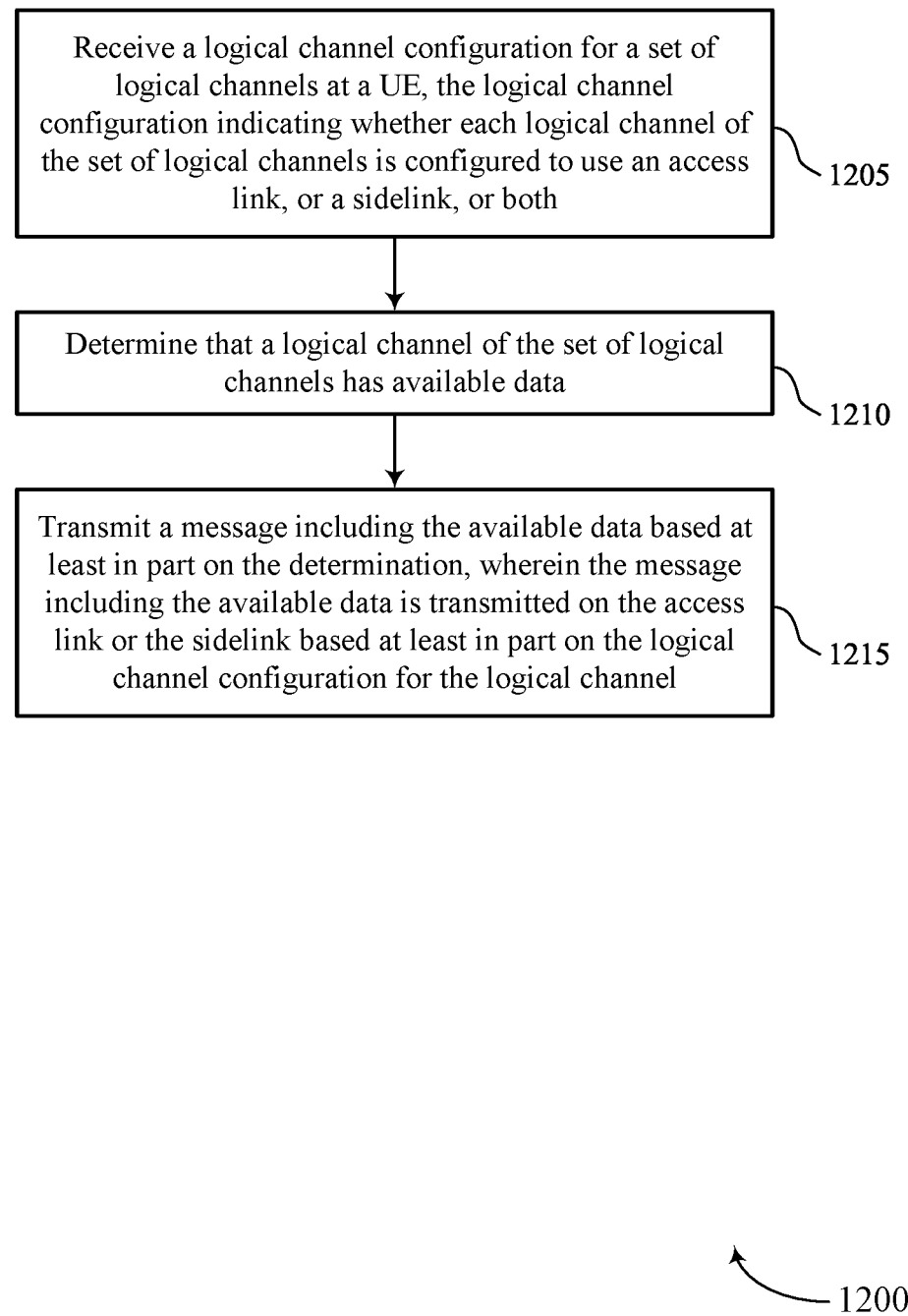
FIGS. 12 through 15 show flowcharts illustrating methods in accordance with aspects of the present disclosure.

FIG. 12 shows a flowchart illustrating a method 1200 in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include receiving a logical channel configuration for a set of logical channels at the UE, the logical channel configuration indicating whether each logical channel of the set of logical channels is configured to use an access link, or a sidelink, or both. The operations of 1205 may be performed in accordance with examples as disclosed herein. In some examples, aspects of the operations of 1205 may be performed by a configuration manager 625 as described with reference to FIG. 6.

At 1210, the method may include determining that a logical channel of the set of logical channels has available data. The operations of 1210 may be performed in accordance with examples as disclosed herein. In some examples, aspects of the operations of 1210 may be performed by a data manager 630 as described with reference to FIG. 6.

At 1215, the method may include transmitting a message including the available data based on the determination, where the message including the available data is transmitted on the access link or the sidelink based on the logical channel configuration for the logical channel. The operations of 1215 may be performed in accordance with examples as disclosed herein. In some examples, aspects of the operations of 1215 may be performed by a data transmitter 635 as described with reference to FIG. 6.

Figure 13:
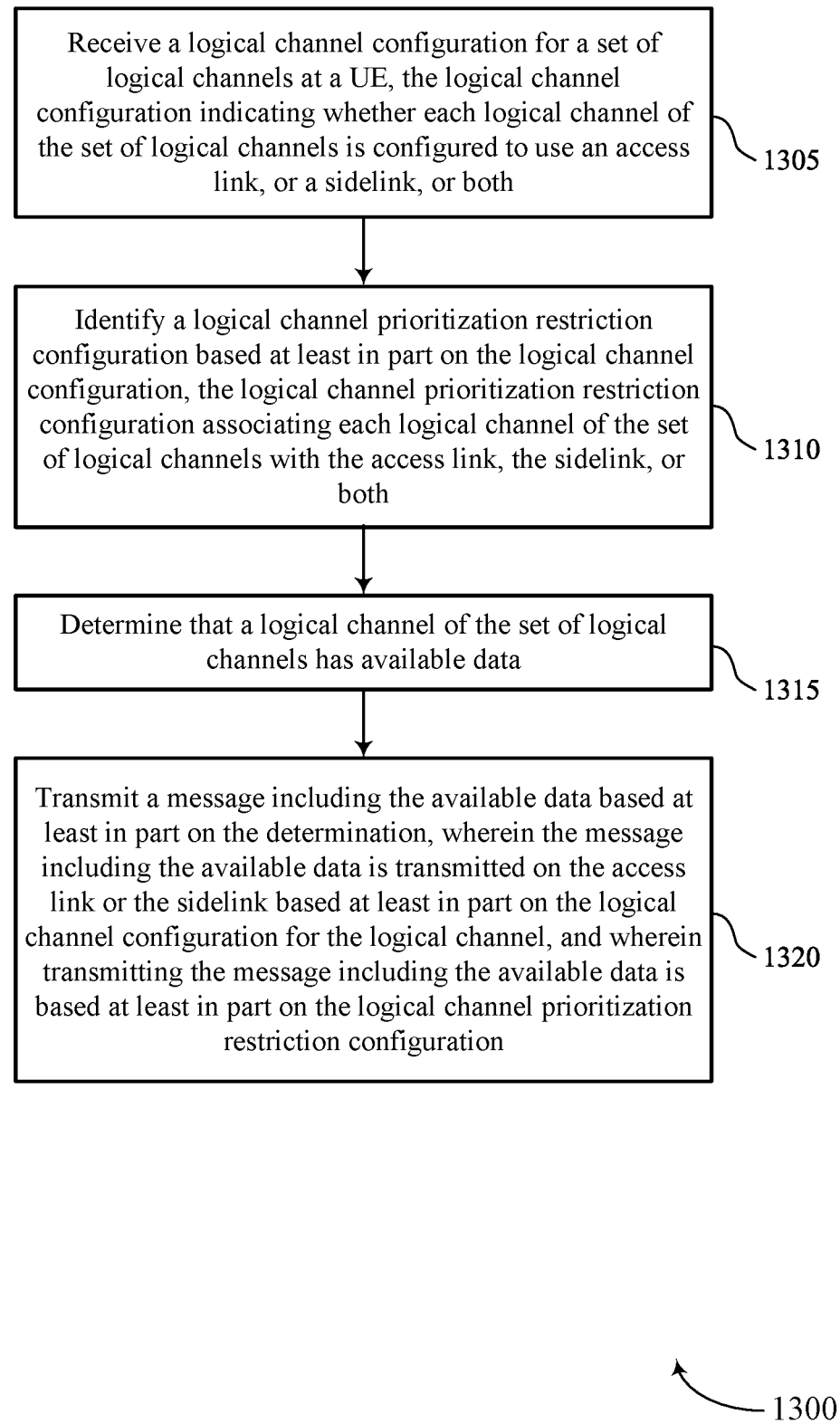

FIG. 13 shows a flowchart illustrating a method 1300 in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include receiving a logical channel configuration for a set of logical channels at the UE, the logical channel configuration indicating whether each logical channel of the set of logical channels is configured to use an access link, or a sidelink, or both. The operations of 1305 may be performed in accordance with examples as disclosed herein. In some examples, aspects of the operations of 1305 may be performed by a configuration manager 625 as described with reference to FIG. 6.

At 1310, the method may include identifying a logical channel prioritization restriction configuration based on the logical channel configuration, the logical channel prioritization restriction configuration associating each logical channel of the set of logical channels with the access link, the sidelink, or both. The operations of 1310 may be performed in accordance with examples as disclosed herein. In some examples, aspects of the operations of 1310 may be performed by a restriction manager 640 as described with reference to FIG. 6.

At 1315, the method may include determining that a logical channel of the set of logical channels has available data. The operations of 1315 may be performed in accordance with examples as disclosed herein. In some examples, aspects of the operations of 1315 may be performed by a data manager 630 as described with reference to FIG. 6.

At 1320, the method may include transmitting a message including the available data based on the determination, where the message including the available data is transmitted on the access link or the sidelink based on the logical channel configuration for the logical channel. In some examples, transmitting the message including the available data is based on the logical channel prioritization restriction configuration. The operations of 1320 may be performed in accordance with examples as disclosed herein. In some examples, aspects of the operations of 1320 may be performed by a data transmitter 635 as described with reference to FIG. 6.

Figure 14:
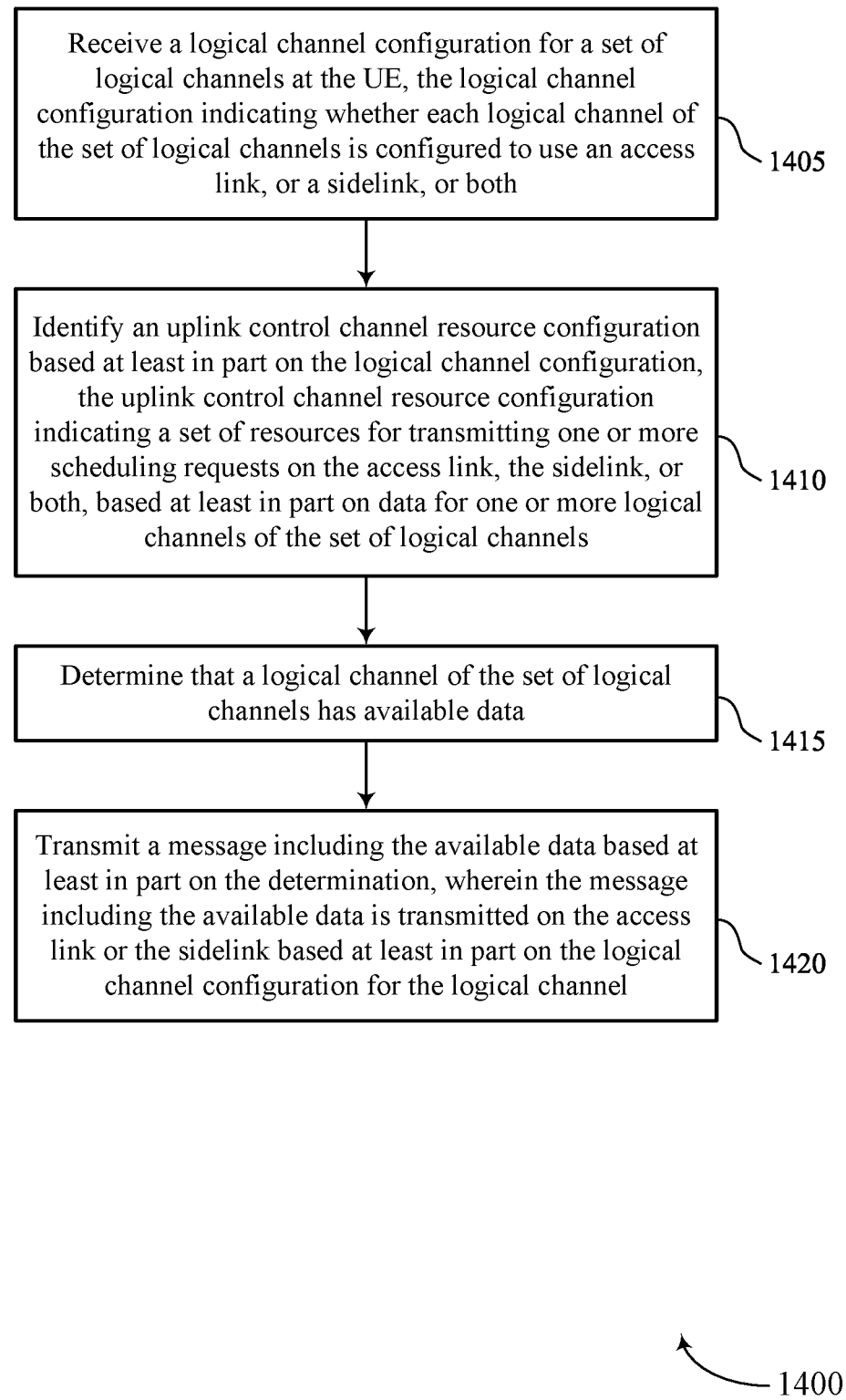

FIG. 14 shows a flowchart illustrating a method 1400 in accordance with aspects of the present disclosure. The operations of the method 1400 may be implemented by a UE or its components as described herein. For example, the operations of the method 1400 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1405, the method may include receiving a logical channel configuration for a set of logical channels at the UE, the logical channel configuration indicating whether each logical channel of the set of logical channels is configured to use an access link, or a sidelink, or both. The operations of 1405 may be performed in accordance with examples as disclosed herein. In some examples, aspects of the operations of 1405 may be performed by a configuration manager 625 as described with reference to FIG. 6.

At 1410, the method may include identifying an uplink control channel resource configuration based on the logical channel configuration, the uplink control channel resource configuration indicating a set of resources for transmitting one or more scheduling requests on the access link, the sidelink, or both, based on data for one or more logical channels of the set of logical channels. The operations of 1410 may be performed in accordance with examples as disclosed herein. In some examples, aspects of the operations of 1410 may be performed by a resource manager 645 as described with reference to FIG. 6.

At 1415, the method may include determining that a logical channel of the set of logical channels has available data. The operations of 1415 may be performed in accordance with examples as disclosed herein. In some examples, aspects of the operations of 1415 may be performed by a data manager 630 as described with reference to FIG. 6.

At 1420, the method may include transmitting a message including the available data based on the determination, where the message including the available data is transmitted on the access link or the sidelink based on the logical channel configuration for the logical channel. The operations of 1420 may be performed in accordance with examples as disclosed herein. In some examples, aspects of the operations of 1420 may be performed by a data transmitter 635 as described with reference to FIG. 6.

Figure 15:
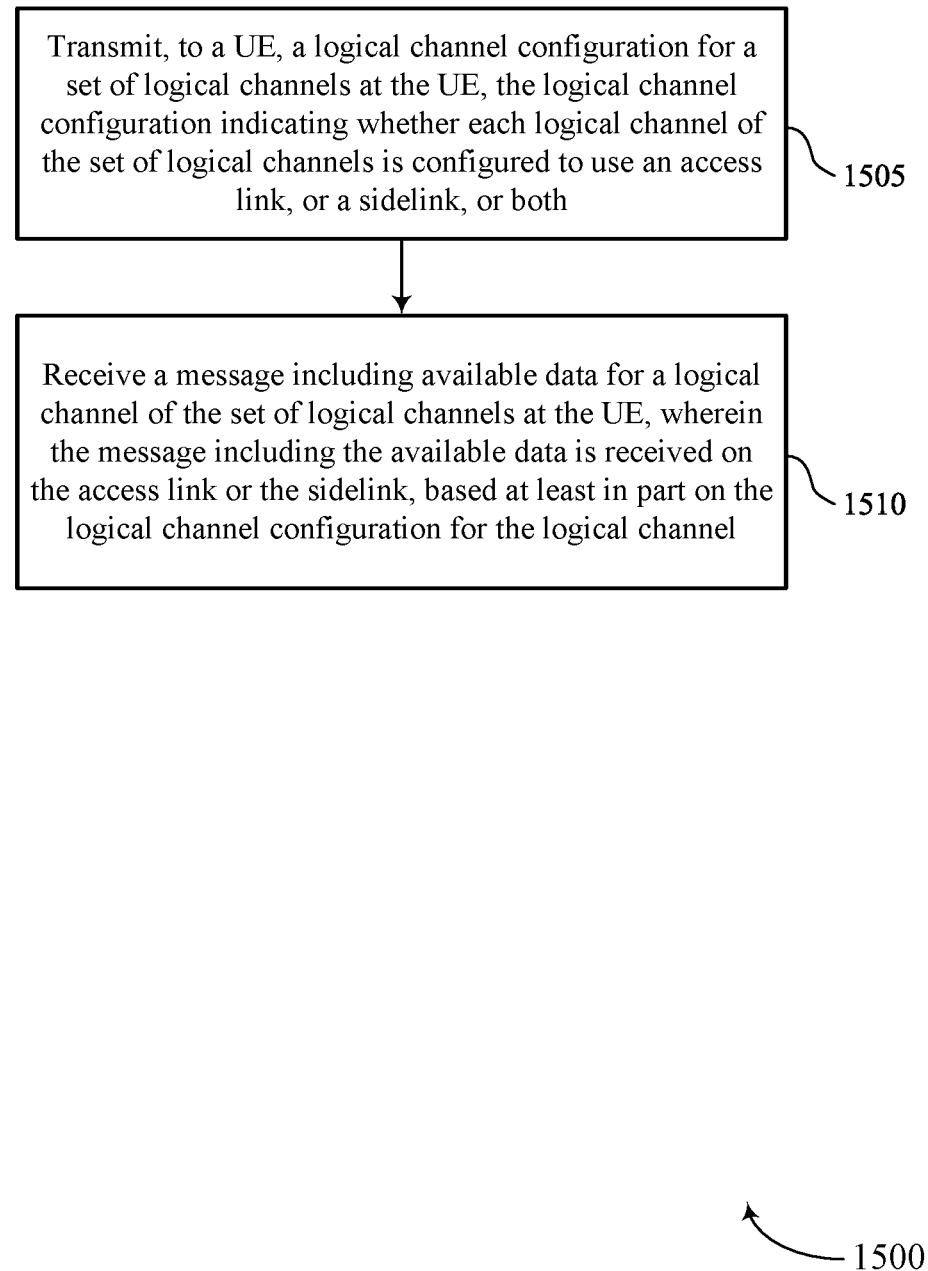

FIG. 15 shows a flowchart illustrating a method 1500 in accordance with aspects of the present disclosure. The operations of the method 1500 may be implemented by a base station or its components as described herein. For example, the operations of the method 1500 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1505, the method may include transmitting, to a UE, a logical channel configuration for a set of logical channels at the UE, the logical channel configuration indicating whether each logical channel of the set of logical channels is configured to use an access link, or a sidelink, or both. The operations of 1505 may be performed in accordance with examples as disclosed herein. In some examples, aspects of the operations of 1505 may be performed by a configuration transmitter 1025 as described with reference to FIG. 10.

At 1510, the method may include receiving a message including available data for a logical channel of the set of logical channels at the UE, where the message including the available data is received on the access link or the sidelink, based on the logical channel configuration for the logical channel. The operations of 1510 may be performed in accordance with examples as disclosed herein. In some examples, aspects of the operations of 1510 may be performed by a message receiver 1030 as described with reference to FIG. 10.

The following provides an overview of aspects of the present disclosure:

Aspect 1: A method for wireless communication at a UE, comprising: receiving a logical channel configuration for a set of logical channels at the UE, the logical channel configuration indicating whether each logical channel of the set of logical channels is configured to use an access link, or a sidelink, or both; determining that a logical channel of the set of logical channels has available data; and transmitting a message including the available data based at least in part on the determination, wherein the message including the available data is transmitted on the access link or the sidelink based at least in part on the logical channel configuration for the logical channel.

Aspect 2: The method of aspect 1, further comprising: identifying a logical channel prioritization restriction configuration based at least in part on the logical channel configuration, the logical channel prioritization restriction configuration associating each logical channel of the set of logical channels with the access link, the sidelink, or both, wherein transmitting the message including the available data is based at least in part on the logical channel prioritization restriction configuration.

Aspect 3: The method of any of aspects 1 through 2, further comprising: identifying an uplink control channel resource configuration based at least in part on the logical channel configuration, the uplink control channel resource configuration indicating a set of resources for transmitting one or more scheduling requests on the access link, the sidelink, or both, based at least in part on data for one or more logical channels of the set of logical channels.

Aspect 4: The method of aspect 3, further comprising: transmitting a scheduling request using the set of resources, wherein the set of resources are selected based at least in part on the available data for the logical channel and one or more scheduling request configurations mapped to the logical channel.

Aspect 5: The method of aspect 4, further comprising: receiving a resource grant for transmitting the available data, the resource grant allocating resources on the access link, or the sidelink, or both, based at least in part on a logical channel prioritization restriction configuration and the logical channel, wherein the resource grant is received based at least in part on the scheduling request.

Aspect 6: The method of any of aspects 4 through 5, further comprising: determining that each scheduling request configuration of the one or more scheduling request configurations indicates uplink control channel resources on the access link, uplink control channel resources on the sidelink, or both; and selecting the set of resources from the uplink control channel resources on the access link or the uplink control channel resources on the sidelink based at least in part on the logical channel being associated with the access link, or the sidelink, or both.

Aspect 7: The method of any of aspects 1 through 6, further comprising: generating a buffer status report indicating that data is available for one or more logical channels of the set of logical channels, wherein the data available for the one or more logical channels comprises the available data for the logical channel; and transmitting the buffer status report on the access link or the sidelink, wherein transmitting a scheduling request is based at least in part on the buffer status report.

Aspect 8: The method of aspect 7, further comprising: determining that the available data for the one or more logical channels of the set of logical channels is restricted to one of the access link or the sidelink based at least in part on a logical channel prioritization restriction configuration and the one or more logical channels, wherein transmitting the buffer status report is based at least in part on determining that the available data for the one or more logical channels of the set of logical channels is restricted to one of the access link or the sidelink.

Aspect 9: The method of aspect 8, wherein transmitting the buffer status report comprises: transmitting the buffer status report on the access link based at least in part on the logical channel being restricted to the access link based at least in part on the logical channel prioritization restriction configuration, the buffer status report comprising an indication of data available for logical channels associated with the access link.

Aspect 10: The method of aspects 8, wherein transmitting the buffer status report comprises: transmitting the buffer status report on the sidelink based at least in part on the logical channel being restricted to the sidelink based at least in part on the logical channel prioritization restriction configuration, the buffer status report comprising an indication of data available for logical channels associated with the sidelink.

Aspect 11: The method of any of aspects 7 through 10, wherein transmitting the buffer status report comprises: transmitting the buffer status report to a base station, wherein the access link and the sidelink are both associated with the base station.

Aspect 12: The method of any of aspects 7 through 11, wherein transmitting the buffer status report comprises: transmitting the buffer status report to a first base station or a second base station different from the first base station, wherein the access link is associated with the first base station and the sidelink is associated with the second base station.

Aspect 13: The method of any of aspects 1 through 12, further comprising: identifying a scheduling priority configuration for the set of logical channels based at least in part on the logical channel configuration, the scheduling priority configuration indicating a priority associated with each logical channel of the set of logical channels for the access link, or the sidelink, or both.

Aspect 14: The method of aspect 13, wherein transmitting the message including the available data comprises: multiplexing data for one or more logical channels based at least in part on the scheduling priority configuration for the one or more logical channels, the multiplexed data including the available data, wherein the one or more logical channels are associated with the access link, or the sidelink, or both, and wherein the message comprises the multiplexed data.

Aspect 15: The method of any of aspects 13 through 14, wherein the scheduling priority configuration indicates a same priority associated with the logical channel of the set of logical channels for the access link and the sidelink.

Aspect 16: The method of any of aspects 13 through 15, wherein the scheduling priority configuration indicates a first priority associated with the access link and the logical channel of the set of logical channels, the first priority being different from a second priority associated with the sidelink and the logical channel of the set of logical channels.

Aspect 17: The method of any of aspects 1 through 16, further comprising: identifying a transport block configuration for the set of logical channels, the transport block configuration indicating one or more transport block sizes for the access link, or the sidelink, or both, associated with each logical channel of the set of logical channels.

Aspect 18: The method of aspect 17, wherein the transport block configuration indicates a maximum transport block size for the access link, or the sidelink, or both associated with each logical channel of the set of logical channels.

Aspect 19: The method of any of aspects 17 through 18, wherein the transport block configuration indicates a minimum transport block size for the access link, or the sidelink, or both associated with each logical channel of the set of logical channels.

Aspect 20: A method for wireless communication at a base station, comprising: transmitting, to a UE, a logical channel configuration for a set of logical channels at the UE, the logical channel configuration indicating whether each logical channel of the set of logical channels is configured to use an access link, or a sidelink, or both; and receiving a message including available data for a logical channel of the set of logical channels at the UE, wherein the message including the available data is received on the access link or the sidelink, based at least in part on the logical channel configuration for the logical channel.

Aspect 21: The method of aspect 20, wherein transmitting the logical channel configuration comprises: transmitting, to the UE, a logical channel prioritization restriction configuration associating each logical channel of the set of logical channels at the UE with the access link, the sidelink, or both.

Aspect 22: The method of any of aspects 20 through 21, wherein transmitting the logical channel configuration comprises: transmitting, to the UE, an uplink control channel resource configuration identifying a set of resources for a scheduling request on the access link, the sidelink, or both.

Aspect 23: The method of aspect 22, further comprising: receiving the scheduling request from the UE on the set of resources, wherein the set of resources are based at least in part on the available data for the logical channel of the set of logical channels and one or more scheduling request configurations mapped to the logical channel; and transmitting, to the UE, a resource grant for transmitting the available data, the resource grant allocating resources on the access link, or the sidelink, or both, based at least in part on a logical channel prioritization restriction configuration and the logical channel, wherein the message including the available data is received based at least in part on the resource grant.

Aspect 24: The method of aspect 23, wherein the message comprises multiplexed data for one or more logical channels of the set of logical channels of the UE, the multiplexed data being based at least in part on a scheduling priority configuration for the one or more logical channels.

Aspect 25: The method of any of aspects 23 through 24, further comprising: receiving, from the UE, a buffer status report indicating that data is available for one or more logical channels of the set of logical channels associated with the UE on the access link or the sidelink based at least in part on the logical channel configuration and the logical channel, wherein receiving the scheduling request from the UE is based at least in part on the buffer status report.

Aspect 26: The method of any of aspects 23 through 25, further comprising: transmitting the one or more scheduling request configurations that indicate uplink control channel resources on the access link, uplink control channel resources on the sidelink, or both, wherein the scheduling request is received on the uplink control channel resources on the access link or the uplink control channel resources on the sidelink based at least in part on the logical channel being associated with the access link, or the sidelink, or both.

Aspect 27: The method of any of aspects 20 through 26, further comprising: transmitting, to the UE, a scheduling priority configuration for the set of logical channels, the scheduling priority configuration indicating a priority associated with each logical channel of the set of logical channels for the access link, or the sidelink, or both.

Aspect 28: The method of any of aspects 20 through 27, further comprising: transmitting a transport block configuration for the set of logical channels, the transport block configuration indicating one or more transport block sizes for the access link, or the sidelink, or both associated with each logical channel of the set of logical channels.

Aspect 29: An apparatus for wireless communication at a UE, comprising a processor; memory coupled with the processor; and instructions stored in the memory and executable by the processor to cause the apparatus to perform a method of any of aspects 1 through 19.

Aspect 30: An apparatus for wireless communication at a UE, comprising at least one means for performing a method of any of aspects 1 through 19.

Aspect 31: A non-transitory computer-readable medium storing code for wireless communication at a UE, the code comprising instructions executable by a processor to perform a method of any of aspects 1 through 19.

Aspect 32: An apparatus for wireless communication at a base station, comprising a processor; memory coupled with the processor; and instructions stored in the memory and executable by the processor to cause the apparatus to perform a method of any of aspects 20 through 28.

Aspect 33: An apparatus for wireless communication at a base station, comprising at least one means for performing a method of any of aspects 20 through 28.

Aspect 34: A non-transitory computer-readable medium storing code for wireless communication at a base station, the code comprising instructions executable by a processor to perform a method of any of aspects 20 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving a logical channel configuration for a set of logical channels at the UE, the logical channel configuration indicating whether each logical channel of the set of logical channels is configured to use an access link, or a sidelink, or both,
   wherein the logical channel configuration indicates at least one logical channel of the set of logical channels that is configured to use a different type of link than another logical channel of the set of logical channels and a set of scheduling request configurations comprising at least a first scheduling request configuration for the access link and a second scheduling request configuration for the sidelink; and
   transmitting a message including available data based at least in part on a logical channel of the set of logical channels having the available data,
   wherein the message including the available data is transmitted via the access link or the sidelink based at least in part on the logical channel configuration for the logical channel.

2. The method of claim 1, further comprising:
   identifying a logical channel prioritization restriction configuration based at least in part on the logical channel configuration, the logical channel prioritization restriction configuration associating each logical channel of the set of logical channels with the access link, the sidelink, or both,
   wherein transmitting the message including the available data is based at least in part on the logical channel prioritization restriction configuration.

3. The method of claim 1, further comprising:
   identifying a control channel resource configuration based at least in part on the logical channel configuration, the control channel resource configuration indicating a set of resources for transmitting one or more scheduling requests on the access link, the sidelink, or both, based at least in part on data for one or more logical channels of the set of logical channels.

4. The method of claim 3, further comprising:
   transmitting a scheduling request using the set of resources,
   wherein the set of resources are selected based at least in part on the available data for the logical channel and one or more scheduling request configurations of the set of scheduling request configurations, the one or more scheduling request configurations being mapped to the logical channel.

5. The method of claim 4, further comprising:
   receiving a resource grant for transmitting the available data, the resource grant allocating resources on the access link, or the sidelink, or both, based at least in part on a logical channel prioritization restriction configuration and the logical channel,
   wherein the resource grant is received based at least in part on the scheduling request.

6. The method of claim 4, further comprising:
   selecting the set of resources from uplink control channel resources on the access link or control channel resources on the sidelink based at least in part on the logical channel being associated with the access link, or the sidelink, or both, wherein each scheduling request configuration of the one or more scheduling request configurations indicates the uplink control channel resources on the access link, the control channel resources on the sidelink, or both.

7. The method of claim 1, further comprising:
generating a buffer status report indicating that data is available for one or more logical channels of the set of logical channels,
wherein the data available for the one or more logical channels comprises the available data for the logical channel; and
transmitting the buffer status report on the access link or the sidelink, wherein transmitting a scheduling request is based at least in part on the buffer status report.

8. The method of claim 7, wherein transmitting the buffer status report comprises:
transmitting the buffer status report based at least in part on the available data for the one or more logical channels of the set of logical channels being restricted to one of the access link or the sidelink,
wherein the available data for the one or more logical channels of the set of logical channels is restricted to one of the access link or the sidelink based at least in part on a logical channel prioritization restriction configuration and the one or more logical channels.

9. The method of claim 8, wherein transmitting the buffer status report comprises:
transmitting the buffer status report via the access link based at least in part on the logical channel being restricted to the access link based at least in part on the logical channel prioritization restriction configuration, the buffer status report comprising an indication of data available for logical channels associated with the access link.

10. The method of claim 8, wherein transmitting the buffer status report comprises:
transmitting the buffer status report via the sidelink based at least in part on the logical channel being restricted to the sidelink based at least in part on the logical channel prioritization restriction configuration, the buffer status report comprising an indication of data available for logical channels associated with the sidelink.

11. The method of claim 7, wherein transmitting the buffer status report comprises:
transmitting the buffer status report to a network device, wherein the access link and the sidelink are both associated with the network device.

12. The method of claim 7, wherein transmitting the buffer status report comprises:
transmitting the buffer status report to a first network device or a second network device different from the first network device,
wherein the access link is associated with the first network device and the sidelink is associated with the second network device.

13. The method of claim 1, further comprising:
identifying a scheduling priority configuration for the set of logical channels based at least in part on the logical channel configuration, the scheduling priority configuration indicating a priority associated with each logical channel of the set of logical channels for the access link, or the sidelink, or both.

14. The method of claim 13, wherein transmitting the message including the available data comprises:
multiplexing data for one or more logical channels based at least in part on the scheduling priority configuration for the one or more logical channels, the data including the available data,
wherein the one or more logical channels are associated with the access link, or the sidelink, or both, and wherein the message comprises the data.

15. The method of claim 13, wherein the scheduling priority configuration indicates a same priority associated with the logical channel of the set of logical channels for the access link and the sidelink.

16. The method of claim 13, wherein the scheduling priority configuration indicates a first priority associated with the access link and the logical channel of the set of logical channels, the first priority being different from a second priority associated with the sidelink and the logical channel of the set of logical channels.

17. The method of claim 1, further comprising:
identifying a transport block configuration for the set of logical channels, the transport block configuration indicating one or more transport block sizes for the access link, or the sidelink, or both, associated with each logical channel of the set of logical channels.

18. The method of claim 17, wherein the transport block configuration indicates a maximum transport block size for the access link, or the sidelink, or both associated with each logical channel of the set of logical channels.

19. The method of claim 17, wherein the transport block configuration indicates a minimum transport block size for the access link, or the sidelink, or both associated with each logical channel of the set of logical channels.

20. A method for wireless communication at a network device, comprising:
transmitting, to a user equipment (UE), a logical channel configuration for a set of logical channels at the UE, the logical channel configuration indicating whether each logical channel of the set of logical channels is configured to use an access link, or a sidelink, or both,
wherein the logical channel configuration indicates at least one logical channel of the set of logical channels that is configured to use a different type of link than another logical channel of the set of logical channels and a set of scheduling request configurations comprising at least a first scheduling request configuration for the access link and a second scheduling request configuration for the sidelink; and
receiving a message including available data for a logical channel of the set of logical channels at the UE,
wherein the message including the available data is received via the access link based at least in part on the logical channel configuration for the logical channel.

21. The method of claim 20, wherein transmitting the logical channel configuration comprises:
transmitting, to the UE, a logical channel prioritization restriction configuration associating each logical channel of the set of logical channels at the UE with the access link, the sidelink, or both.

22. The method of claim 20, wherein transmitting the logical channel configuration comprises:
transmitting, to the UE, a control channel resource configuration identifying a set of resources for a scheduling request on the access link, the sidelink, or both.

23. The method of claim 22, further comprising:
receiving the scheduling request from the UE on the set of resources, wherein the set of resources are based at least in part on the available data for the logical channel of the set of logical channels and one or more scheduling request configurations of the set of scheduling request configurations, the one or more scheduling request configurations being mapped to the logical channel; and transmitting, to the UE, a resource grant for transmitting the available data, the resource grant allocating resources on the access link, or the sidelink, or both, based at least in part on a logical channel prioritization restriction configuration and the logical channel, wherein the message including the available data is received based at least in part on the resource grant.

24. The method of claim 23, wherein the message comprises multiplexed data for one or more logical channels of the set of logical channels of the UE, the multiplexed data being based at least in part on a scheduling priority configuration for the one or more logical channels.

25. The method of claim 23, further comprising:

receiving, from the UE, a buffer status report indicating that data is available for one or more logical channels of the set of logical channels associated with the UE on the access link or the sidelink based at least in part on the logical channel configuration and the logical channel, wherein receiving the scheduling request from the UE is based at least in part on the buffer status report.

26. The method of claim 23, further comprising:

transmitting the one or more scheduling request configurations that indicate uplink control channel resources on the access link, control channel resources on the sidelink, or both, wherein the scheduling request is received on the uplink control channel resources on the access link based at least in part on the logical channel being associated with the access link.

27. The method of claim 20, further comprising:

transmitting, to the UE, a scheduling priority configuration for the set of logical channels, the scheduling priority configuration indicating a priority associated with each logical channel of the set of logical channels for the access link, or the sidelink, or both.

28. The method of claim 20, further comprising:

transmitting a transport block configuration for the set of logical channels, the transport block configuration indicating one or more transport block sizes for the access link, or the sidelink, or both associated with each logical channel of the set of logical channels.

29. An apparatus for wireless communication at a user equipment (UE), comprising:

a processor;

memory coupled with the processor; and instructions stored in the memory and executable by the processor to cause the apparatus to:

receive, via a receiver, a logical channel configuration for a set of logical channels at the UE, the logical channel configuration indicating whether each logical channel of the set of logical channels is configured to use an access link, or a sidelink, or both, wherein the logical channel configuration indicates at least one logical channel of the set of logical channels that is configured to use a different type of link than another logical channel of the set of logical channels and a set of scheduling request configurations comprising at least a first scheduling request configuration for the access link and a second scheduling request configuration for the sidelink; and transmit, via a transmitter, a message including available data based at least in part on a logical channel of the set of logical channels having the available data, wherein the message including the available data is transmitted on the access link or the sidelink based at least in part on the logical channel configuration for the logical channel.

30. An apparatus for wireless communication at a network device, comprising:

a processor;

memory coupled with the processor; and instructions stored in the memory and executable by the processor to cause the apparatus to:

transmit, via a transmitter and to a user equipment (UE), a logical channel configuration for a set of logical channels at the UE, the logical channel configuration indicating whether each logical channel of the set of logical channels is configured to use an access link, or a sidelink, or both, wherein the logical channel configuration indicates at least one logical channel of the set of logical channels that is configured to use a different type of link than another logical channel of the set of logical channels and a set of scheduling request configurations comprising at least a first scheduling request configuration for the access link and a second scheduling request configuration for the sidelink; and receive, via a receiver, a message including available data for a logical channel of the set of logical channels at the UE, wherein the message including the available data is received via the access link based at least in part on the logical channel configuration for the logical channel.

* * * * *